United States Patent
Pozgay et al.

(10) Patent No.: US 6,320,541 B1
(45) Date of Patent: Nov. 20, 2001

(54) OFF-AXIS INDICATOR ALGORITHM FOR ELECTRICALLY LARGE ANTENNAS

(75) Inventors: Jerome H. Pozgay, Medford; Wesley T. Dull, Chelmsford; Lawrence A. Durfee, Waltham, all of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/504,625

(22) Filed: Feb. 15, 2000

Related U.S. Application Data

(60) Provisional application No. 60/120,379, filed on Feb. 17, 1999.

(51) Int. Cl.[7] .............................. G01S 5/02; G01S 13/00
(52) U.S. Cl. ............................................ 342/427; 342/149
(58) Field of Search .................................. 342/368–384, 342/427, 149–154

(56) References Cited

U.S. PATENT DOCUMENTS 5,400,035  3/1995  Liu .

FOREIGN PATENT DOCUMENTS 2 292 493 A  2/1996  (GB) .

OTHER PUBLICATIONS

Hoffman,John B. et al. "Four–Channel Monopulse for Main Beam Nulling and Tracking", XP000697852, Proceedings of the IEEE National Radar Conference, New York, May 13, 1997, pp. 94–98.

Sherman, S.M., "Monopulse Principles and Techniques", Dedham, Artech House Inc., 1984, XP–003248537, Section "The diagonal difference signal", pp. 339–343.

International Search Report for International Application No. PCT/US00/03892.

*Primary Examiner*—Thomas H. Tarcza
*Assistant Examiner*—Fred H Mull
(74) *Attorney, Agent, or Firm*—Daly, Crowley, & Mofford LLP

(57) ABSTRACT

A technique is described which makes novel use of monopulse data to augment the normal CFAR detection processing by incorporating monopulse data in a computationally simple way into the detection decision process such that off-axis signals which are of sufficient strength to pass a CFAR detection threshold are effectively rejected by a second detection threshold. The signal compared to the second detection threshold is formed from all of the monopulse channels. Detection processing is thus a two step process, incorporating not only the information contained in the magnitude of the Sum channel, but information contained in all of the monopulse channels.

15 Claims, 17 Drawing Sheets

— LEFT HALF APERTURE
--- RIGHT HALF APERTURE
— SUM

— LEFT HALF APERTURE
--- RIGHT HALF APERTURE

OFF-AXIS INDICATOR ALGORITHM FOR ELECTRICALLY LARGE ANTENNAS

CROSS-REFERENCE TO RELATED APPLICATIONS

This application claims priority under 35 U.S.C. §119(e) from U.S. provisional application No. 60/120,379 filed on Feb. 17, 1999.

STATEMENTS REGARDING FEDERALLY SPONSORED RESEARCH

Not applicable.

FIELD OF THE INVENTION

This invention relates generally to radar systems and more particularly to systems and techniques for monopulse processing in such radar systems.

BACKGROUND OF THE INVENTION

One of the most common uses for military radar systems is discerning the angle of arrival of a signal relative to the radar. The fundamental way in which a radar determines angle of arrival is to use a directional antenna on both transmit and receive. The antenna sidelobes significantly attenuate off axis signals, thereby making the radar most sensitive to signals entering through the mainbeam. The mainbeam signal is then processed to determine its angle of arrival relative to the direction in which the antenna is pointing. Meaningful angle of arrival information is available only for targets located in the mainbeam of the radar antenna. Sidelobe targets, when they are of sufficient strength to overcome the sidelobe attenuation of the antenna, yield erroneous angle of arrival data. A radar used to search for and track targets must therefore have some means for discerning off-axis signals in the sidelobes from those entering the mainbeam.

Typically, three primary techniques for identifying off-axis signals are currently in widespread use. The first is the use of a guard channel or channels having a separate broad beam antenna with more gain than the side lobes of the primary receive channel (in the case of a monopulse radar, the Sum channel is the primary receive channel). When the guard channel signal level exceeds that of the Sum channel, off-axis indication is given. The second is the Track method, where off-axis signals are placed under track, and then ignored when their range and/or Doppler do not match that expected for the target of primary interest. The Track method is used primarily to reject discrete clutter when the target of interest is moving relative to the clutter (i.e., is separated in Doppler relative to that of the discrete clutter), and finds application in Medium Pulse Repetition Rate Frequency (MPRF) radars where the processed Doppler space is ambiguous with the Doppler of both the target signal and sidelobe clutter signal. The final technique, applicable to a monopulse radar, is to compare the detected boresight error to a threshold. When the detected boresight error exceeds the threshold in one or both of the principle angle tracking planes of the radar (e.g., pitch or yaw), an off-axis indication is given. This two channel OR technique is based on the principle that in the sidelobe region, the difference pattern sidelobes typically exceed the sum pattern sidelobes over a significant portion of angle space. The two channel OR techniques works best for off-axis signals located on or near one of the principal angle tracking planes of the radar.

While both the guard channel and Track methods can be highly effective, neither is very appealing in an airborne missile application. In airborne missile applications, both packaging volume and time are in very short supply. Available space to package the radar hardware is generally very limited, and with the high velocities involved with missile applications, there is very little time to search for and acquire targets (modern missiles generally have a terminal sensor which is cued to the general location of the target by either off-board or on-board tracks). Guard channels require additional hardware, while placing off-axis targets under track complicates the on-board computer hardware (in terms of having sufficient throughput to process a potentially large number of extraneous tracks) and slows the radar search process by the time needed to initiate tracks and resolve any range and Doppler ambiguities that may be present with the waveforms in use. With the trend toward the use of millimeter wave seekers in missile applications, the seeker antenna is electrically large, thus having high gain. The near in sidelobes, which cover an important portion of angle space, can be well above isotropic, meaning that the guard channel antenna required to cover the near in sidelobe region must be directional. To cover both the near in and far out sidelobes, multiple guard channels can be required, depending on the characteristics of the seeker antenna.

The two channel OR method of off-axis indication is simple, requiring no additional hardware or calculation beyond that used for normal angle of arrival processing. For planes well off of the principle angle tracking planes, however, off-axis identification degrades compared to that in the principal planes.

It would, therefore, be desirable to provide a technique which addresses at least the above problems with prior art systems.

SUMMARY OF THE INVENTION

In accordance with the present invention, a method of operating a monopulse radar system includes the steps of: forming a sum signal, $\Sigma$, an azimuth difference signal, $\Delta_{az}$, an elevation difference signal, $\Delta_{el}$, and a quadrupole, or diagonal difference signal, Q, and obtaining magnitudes of each of the respective signals; comparing the magnitude of the azimuth difference signal, $\Delta_{az}$ with the magnitude of the sum signal, $\Sigma$; comparing the magnitude of the elevation difference signal, $\Delta_{el}$ with the magnitude of the sum signal, $\Sigma$; comparing the magnitude of the Q difference signal, Q with the magnitude of the sum signal, $\Sigma$; summing each result of the comparing steps; and comparing the summed result with a threshold value to determine an off-axis indication. With such a technique, use of monopulse data is provided to augment the normal CFAR detection processing. Normal CFAR processing typically uses only the magnitude of the Sum channel signal to make detection decisions. The invention described herein incorporates monopulse data in a computationally simple way into the detection decision process such that off-axis signals which are of sufficient strength to pass the CFAR detection threshold are effectively rejected by a second detection threshold. The signal compared to the second detection threshold is formed from all of the monopulse channels. Detection processing is thus a two step process, incorporating not only the information contained in the magnitude of the Sum channel, but information contained in all of the monopulse channels. The invention can eliminate off-axis detections with 95% or greater certainty, with minor loss in mainlobe detection probability. Detailed quantitative performance data as a function of signal to noise ratio is also provided.

Essential features of the invention are demonstrated for the W-Band 150 mm diameter aperture described in "Principles and Applications of Millimeter-Wave Radar" by Currie and Brown (1987, Artech House). The Currie and Brown aperture has been modified with a 0.375 in. radius blockage to simulate an amplitude monopulse aperture with low sum and difference sidelobes.

In accordance with another feature of the invention, a method of operating a monopulse radar system includes the steps of: forming a respective digital signal indicative of a signal from each quadrant of a monopulse antenna; forming a sum signal indicative of a combined signal from all quadrants of the monopulse antenna and deriving a magnitude of said sum signal; forming difference signals of each possible combination of signals from each quadrant of the monopulse antenna and deriving a magnitude of each of the respective difference signals; comparing the magnitude of each of the difference signals to a magnitude of the sum signal; and summing any result. The result is compared with a threshold value to determine if an off-axis indication is warranted. With such an arrangement, improved off-axis signal rejection is obtained by being able to detect such off-axis signals and then filtering such signals from the desired signals.

BRIEF DESCRIPTION OF THE DRAWINGS

The foregoing features of this invention as well as the invention itself may be more fully understood from the following detailed description of the drawings, in which.

DETAILED DESCRIPTION OF THE INVENTION

Figure 1:
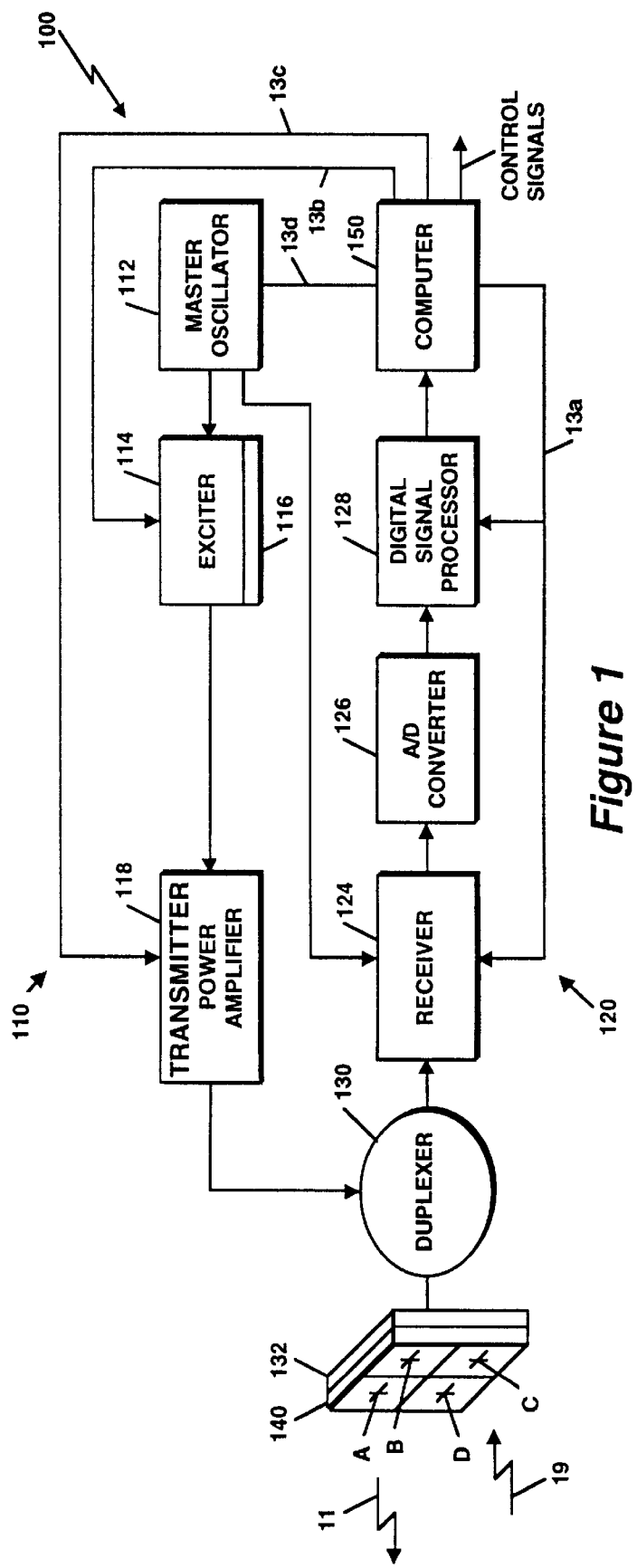
FIG. 1 is a block diagram of a radar system incorporating the present invention.

Referring now to the drawings, in which like reference characters designate like or corresponding parts or signals throughout the several views, there is shown in FIG. 1 a block diagram of a radar system 100 comprising a computer 150, a master oscillator 112, transmitter 110, a receiver 120, a duplexer 130 and an antenna 140. The transmitter 110 includes an exciter 114, exciter control circuitry 116 and a transmitter power amplifier 118. The receiver 120 includes a receiver 124, analog-to-digital (A/D) converter 126, and a digital signal processor 128. The radar system 100 further includes monopulse arithmetic circuitry 132 to form a sum channel and an azimuth, an elevation and a Q channel according to the present invention. The system of FIG. 1 represents a pulse radar system, although it is to be understood that the present invention may be adapted for use in other systems.

The computer 150 provides reference signals 13$a$–13$d$ to provide the various components of the radar system 100 the requisite control signals as described hereinafter. In a conventional manner, the master oscillator 112 in response to the computer 150 provides a signal to the exciter 114 which in turn provides an RF signal at the output thereof. The RF signal 11 is then fed to the transmitter power amplifier 118 where the transmitted signal is amplified, and via duplexer 130, is fed to antenna 140. The antenna 140 is a monopulse antenna. As antenna 140 scans the search area, a received signal 19 is reflected by objects within the operating range of the radar system 100. Received signal 19 is then received by antenna 140. In conventional fashion, received signal 19 is fed from the antenna 140 to the monopulse arithmetic circuitry 132 to form a sum signal and an azimuth difference signal, an elevation difference signal and a Q difference signal which are fed to the receiver 124 which in turn heterodynes the just mentioned signals with a signal from the master oscillator 112 to produce baseband signals. The baseband signals are fed to the A/D converter 126 which in turn produces discrete time samples of the baseband signals, the sampled baseband signals then being fed to the digital signal processor 128. In accordance with the present invention, the digital signal processor 128 then performs additional analysis such as a discrete Fourier transform to determine Doppler frequencies and other information of interest in a manner as described hereinafter. The latter is then fed to the computer 150 to provide control signals to control a vehicle as well as the various components of the radar system 110. It is to be understood that while digital signal processor 128 and computer 150 are shown separately, a single computer may be alternatively used or a combination of multiple computers and digital signal processors may be used. The receiver 120 also includes a CFAR detection circuit to filter out undesired signals including signals from antenna sidelobes and a nulling circuit to reject off-axis signals which are of sufficient strength to pass the CFAR detection circuit when there is a positive off axis indication signal.

The radar system 100, here a four-channel monopulse receiver, according to this invention, is conventional in construction to produce. In the monopulse antenna 140 and monopulse arithmetic circuitry 132, a sum beam (not shown) of radio frequency energy, such beam here having a boresight line orthogonal to the aperture of the monopulse antenna as shown is produced. That aperture, as shown, here is divided into four equal sectors (or quadrants), each with a phase center A, B, C or D. As is known, the radio frequency (RF) signal in the receive mode at each phase center A, B, C and D is the vectorial sum of the RF signals received by the antenna elements (not shown) in the corresponding quadrant. It will be appreciated, therefore, that (in the receive mode) a monopulse sum signal, $\Sigma(RF)$, an elevation difference signal, $\Delta_{el}(RF)$, an azimuth difference signal $\Delta_{az}(RF)$ and Q signal $\Delta_Q(RF)$ derived from a single target and appearing at the various output ports of the illustrated monopulse arithmetic circuitry may be described as follows:

$$\Sigma(RF) = V_A + V_B + V_C + V_D$$

$$\Delta_{el}(RF) = (V_A + V_B) - (V_C + V_D)$$

$$\Delta_{az}(RF) = (V_A + V_D) - (V_B + V_C)$$

$$\Delta_Q(RF) = (V_A + V_C) - (V_B + V_D)$$

where $V_A$, $V_B$, $V_C$ and $V_D$ each is a vectorial quantity.

It should be noted that for a target (not shown) on boresight of a monopulse antenna 140 having four quadrants, in an ideal monopulse system, signals from each of the four quadrants of the monopulse antenna 140 would be equal. The signals can be combined in monopulse arithmetic circuitry 132 to yield a sum channel and an azimuth difference channel, an elevation difference channel and a Q difference channel. The sum channel would be a maximum and the remaining channels would be zero. In a non-ideal monopulse system, signals detected by sidelobes of the monopulse antenna 140, can cause errors in the resulting control signals produced by the radar system 100.

The invention is a set of techniques and algorithms which indicate to a monopulse radar whether a signal is arriving from a direction corresponding to the pointing direction of the antenna main beam, or from a direction corresponding to directions covered by the antenna sidelobes. With these algorithms, reliable indication is achieved with information already available to the typical tracking radar. The algorithms can be applied in phase or amplitude monopulse configurations and for fixed beam or phase array antenna architectures. The algorithms are applicable to existing four-channel monopulse systems and implementation would not require changes to the hardware configurations of four-channel monopulse antennas or radars. The common thread unifying the set of algorithms is comparison of signals in all data channels of a four-channel monopulse radar.

Figure 2A:
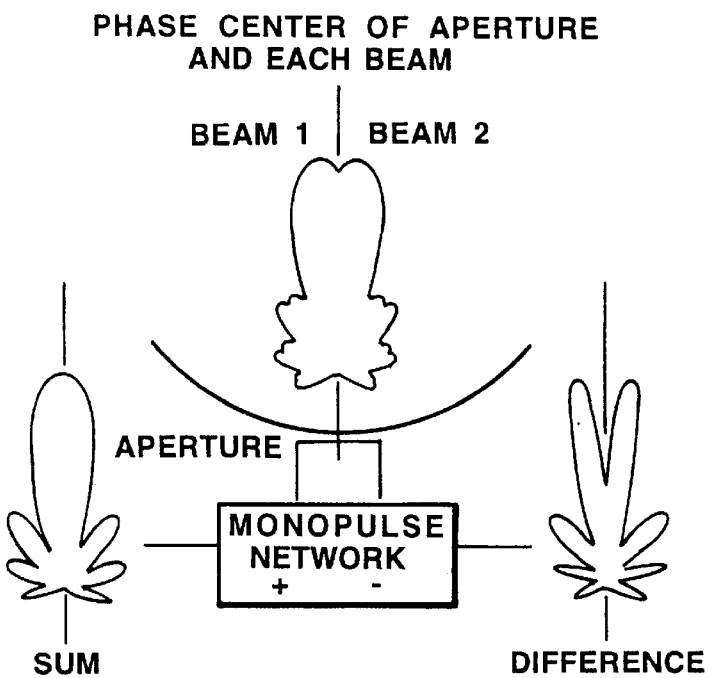
FIG. 2A is a two beam amplitude monopulse antenna radiation pattern.
Figure 2B:
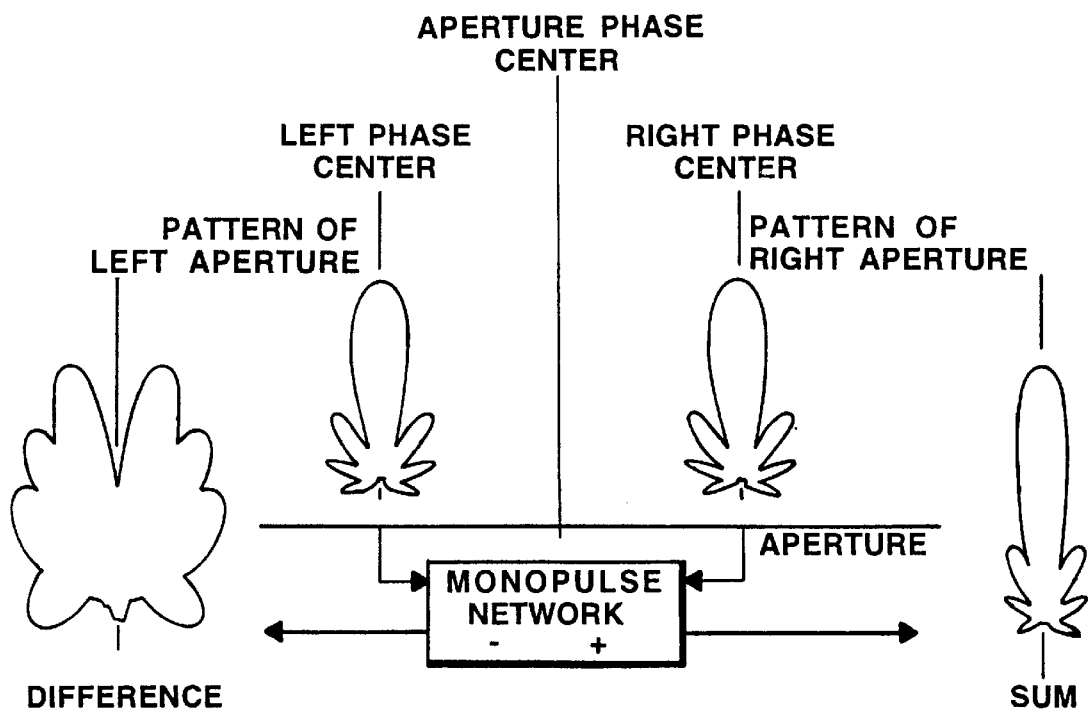
FIG. 2B is a two beam phase monopulse antenna radiation pattern.

Before departing on a detailed description of the invention, it may be helpful to review the state of the art. Reliable sidelobe indication is achieved by comparing the response to a common signal in four channels of a monopulse radar. The common generic monopulse radars use amplitude monopulse or phase monopulse antennas. In an amplitude monopulse system, the antenna forms orthogonal RF channels by adding and subtracting common source responses of four beams sharing a common phase center and pointed in known, but specifically not overlapped, directions in space as illustrated for a two beam amplitude monopulse antenna in FIG. 2A. The radar derives angle information by comparing the amplitudes and signs of the sum and difference channel outputs. In a phase monopulse system, the antenna forms orthogonal channels by adding and subtracting common source complex responses of parallel beams associated with the half apertures of the antenna as shown in FIG. 2B. Note the beams do not share a common phase center. Angle information is derived as for amplitude monopulse.

Figure 2C:
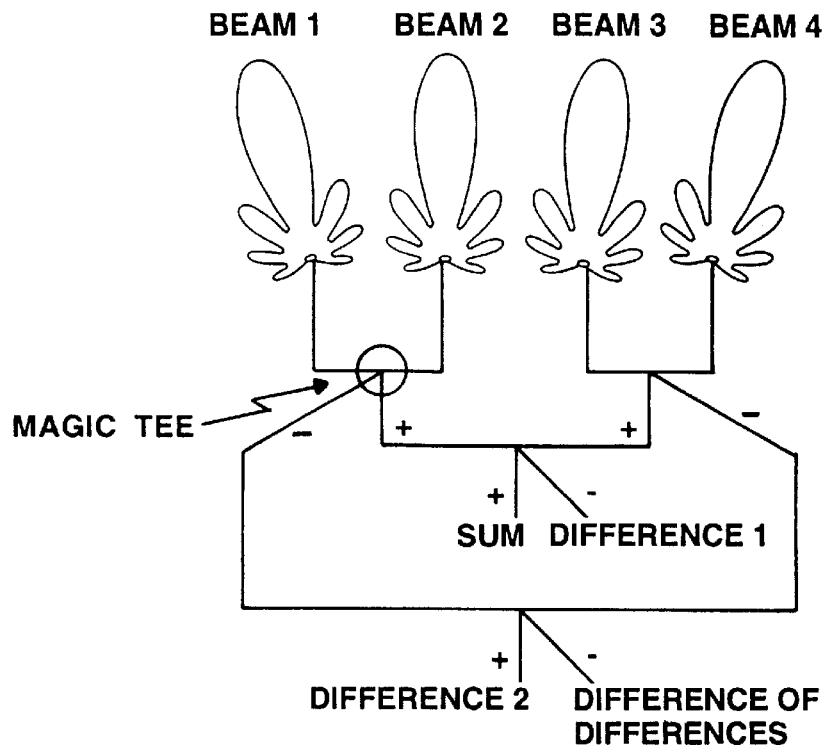
FIG. 2C is an amplitude monopulse beamforming radiation pattern.
Figure 2D:
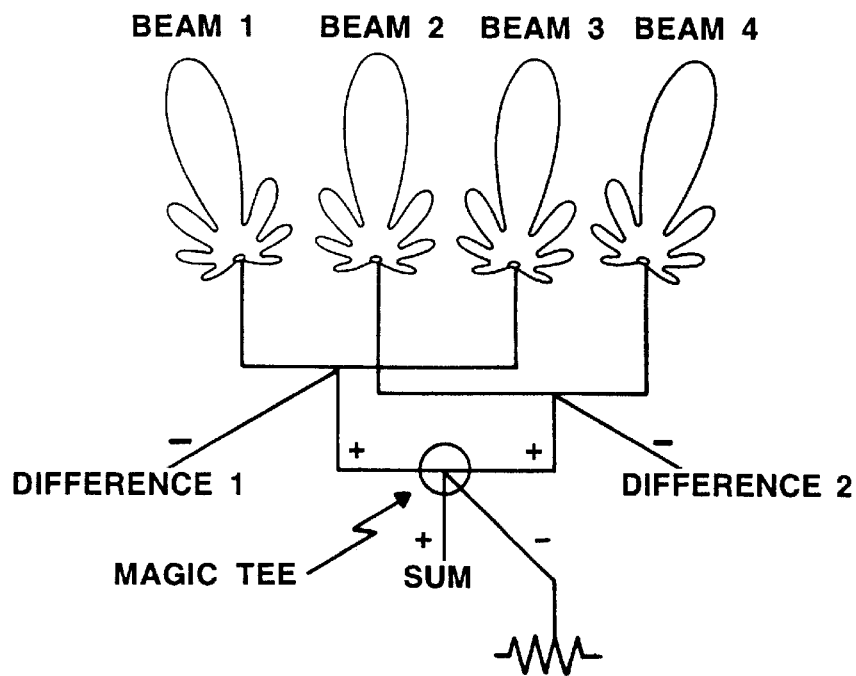
FIG. 2D is a pairwise amplitude monopulse configuration.

In most typical monopulse radars, the antenna provides monopulse RF outputs. That is, prior to active operation on the received signal, a microwave monopulse network (i.e. monopulse arithmetic circuitry) is used to combine the RF energy in each beam or from each aperture segment to form the standard monopulse output set of sum, two differences and (sometimes) the difference of difference (sometimes referred to as the Q Channel) outputs. This is not a necessary condition of operation, particularly with the advances in digital processing over the last decade. RF processing works well in numerous fielded systems. The four beams of an amplitude monopulse antenna can be added and subtracted in an RF network comprised of line lengths and magic tee power dividers as shown in FIG. 2C. The network in the FIG. 2C is generally associated with combining, the four beams in pairs of pairs across the aperture phase center although other configurations are possible. In particular, the beams can be combined in simple pairs across the phase center, as shown in FIG. 2D, though this arrangement leads to lower difference channel antenna gain relative to the sum. The same networks can be used to combine the outputs of each phase center of the phase monopulse network.

Figure 2E:
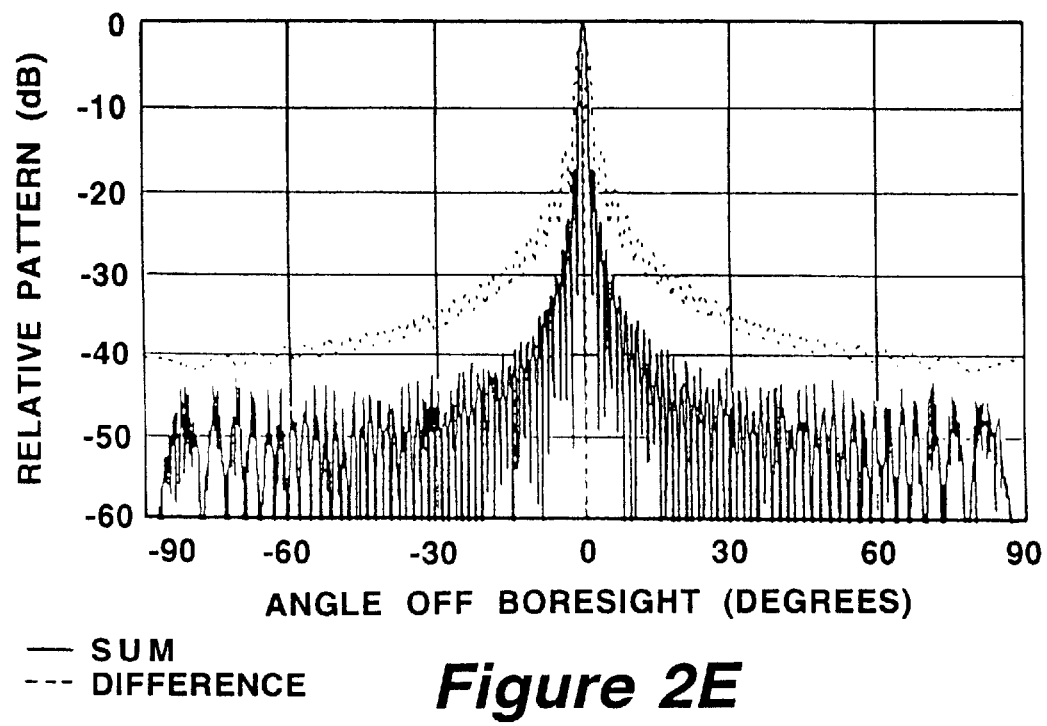
FIG. 2E illustrates typical characteristics of phase monopulse sum and difference patterns.
Figure 2F:
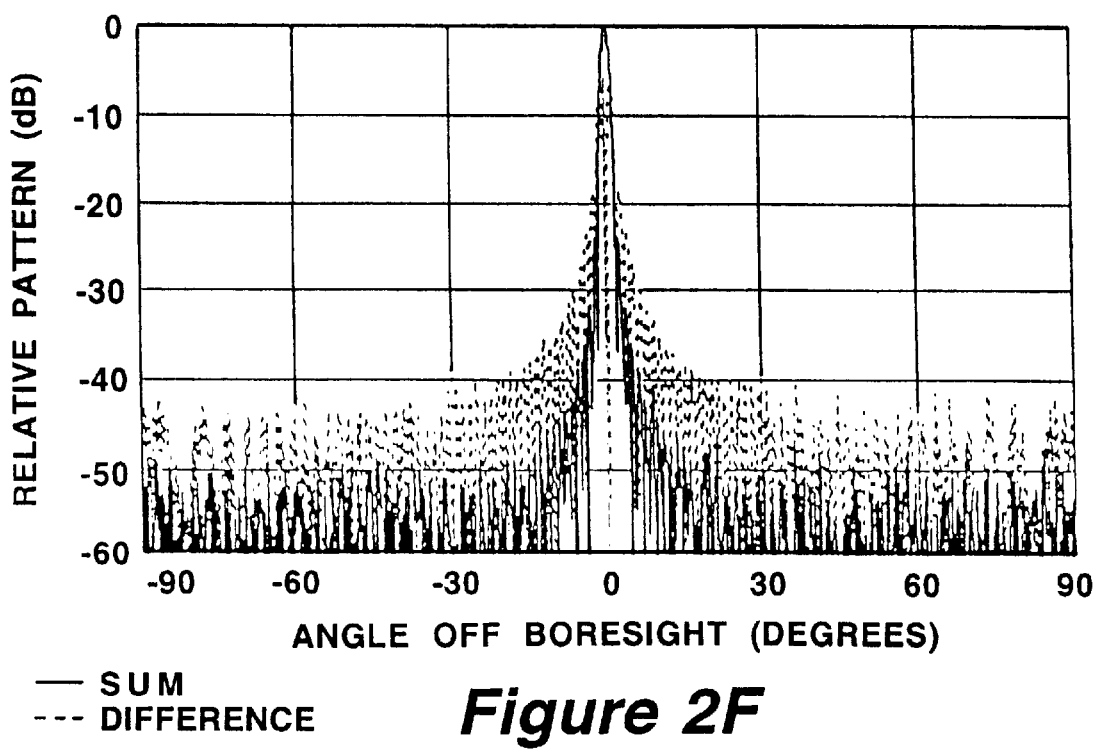
FIG. 2F illustrates typical characteristics of amplitude monopulse sum and difference patterns.

A major distinction between amplitude and phase monopulse is the fall off rate of the far field tracking pattern sidelobe response relative to that of the sum pattern. Typical phase monopulse pattern cuts are shown in FIG. 2E for a uniformly illuminated 150 mm diameter circular aperture operating at 94 GHz. (This aperture and its applications are discussed in "Principles and Applications of Millimeter-Wave Radar" by Currie and Brown.) As subtracting the responses of aperture halves creates a phase monopulse antenna difference pattern, a large (effective) illumination discontinuity is produced at the full aperture phase center. This discontinuity results in high difference pattern sidelobes in the plane orthogonal to the excitation (the sidelobe level difference decreases as the cut plane moves off the plane of the difference). Furthermore, as the sum pattern sidelobe response improves (that is, as the sum sidelobes go down relative to full antenna gain), the influence of the discontinuity increases, further increasing the difference pattern sidelobe levels. In the plane of the difference, an amplitude monopulse system has intrinsically lower difference channel sidelobes than a phase monopulse system: with an amplitude monopulse antenna the strong central discontinuity is eliminated and the individual beam pattern symmetry with respect to the full aperture phase center is maintained. Amplitude monopulse pattern cuts with the characteristics typical of large aperture antenna patterns are shown in FIG. 2F.

Figure 2G:
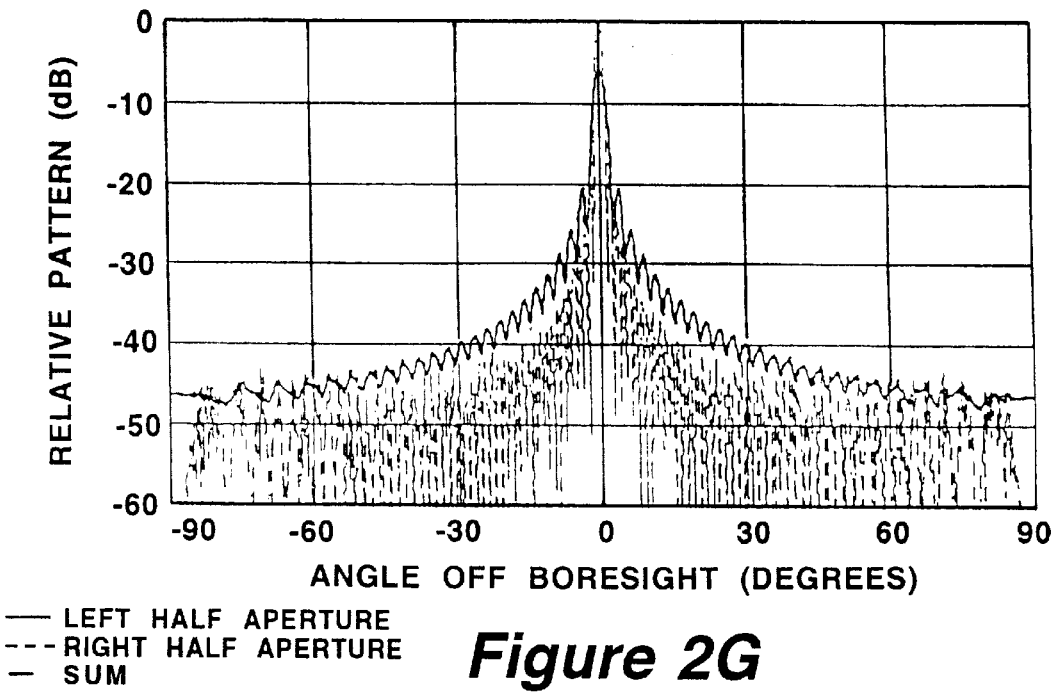
FIG. 2G shows a comparison of patterns from half and full apertures (150 mm Circular Aperture at 94 GHz, from Currie and Brown)
Figure 2H:
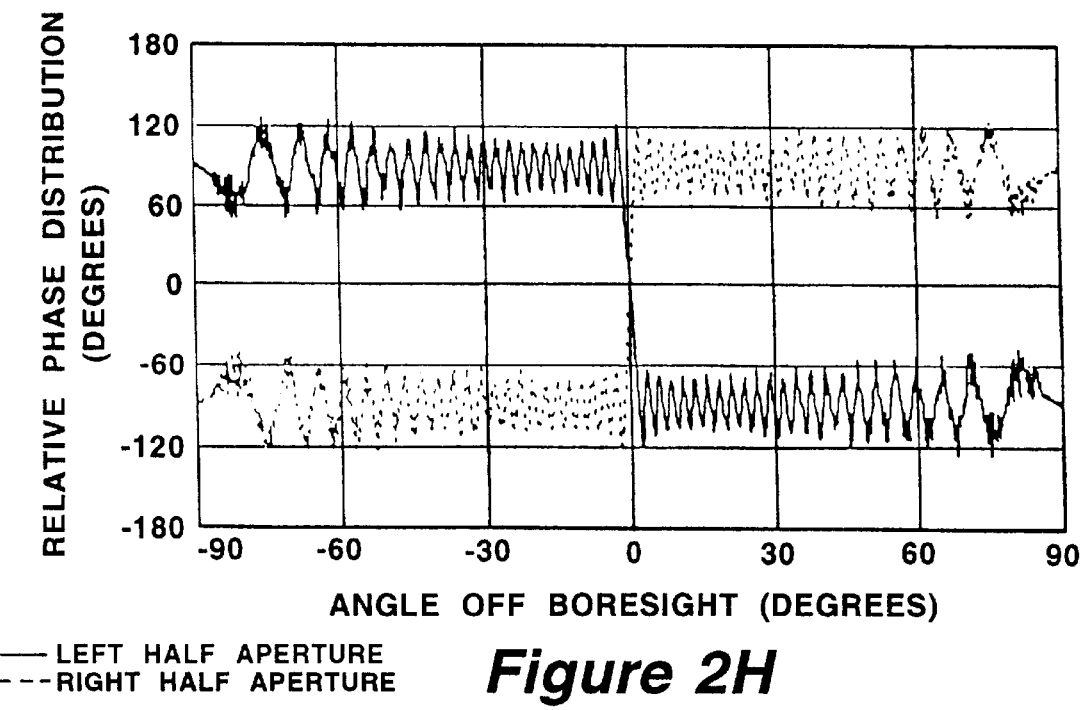
FIG. 2H shows pattern phase distributions for uniform illumination of circular aperture halves (150 mm Circular Aperture at 94 GHz, from Currie and Brown)

Note that the difference pattern sidelobes of the phase monopulse antenna patterns in FIG. 2E are high relative to the sum pattern sidelobes and that the nulls of the difference pattern are filled. Two mechanisms contribute to null fill for this particular phase monopulse antenna. First, the aperture is circular, resulting in asymmetric half aperture illumination distributions: patterns produced by asymmetric distributions have filled nulls. FIG. 2G compares pattern cuts produced by halves of an electrically large uniformly illuminated circular planar aperture with random errors: the sum pattern is shown for reference. Patterns are taken in the plane orthogonal to the plane of the discontinuity. The half aperture patterns are substantially identical and symmetric. Note that the half aperture pattern sidelobe region forms the sum pattern sidelobe envelope when properly normalized. Secondly, half aperture patterns have conjugate symmetry with respect to the full aperture phase center. This is illustrated in FIG. 2H. FIG. 2H shows half aperture pattern phase for the specific measurement condition of rotation about the full aperture phase center. Pattern phase is substantially >90 degrees in the sidelobe region. Difference pattern formation (a subtraction process) adds nearly identical responses having no nulls thereby producing a total pattern without nulls. Sum pattern formation (an addition process) subtracts nearly identical responses, thereby producing a total pattern with deep nulls.

Figure 3A:
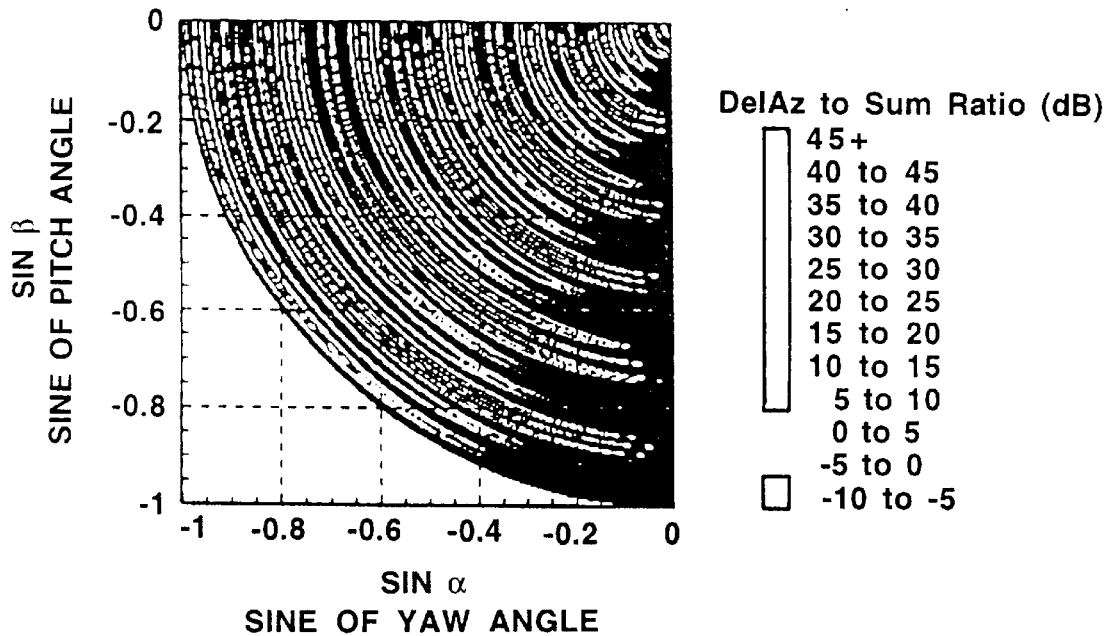
FIG. 3A illustrates the yaw difference to sum ratio for amplitude monopulse antenna (Currie and Brown aperture)
Figure 3B:
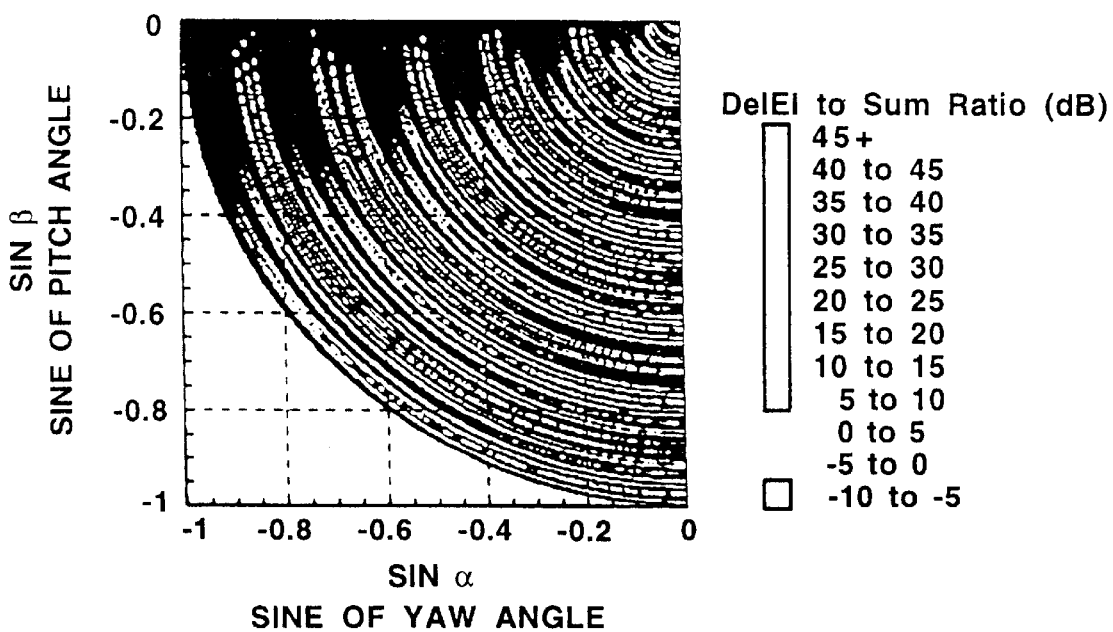
FIG. 3B illustrates the pitch difference to sum ratio for amplitude monopulse antenna (Currie and Brown aperture)
Figure 3C:
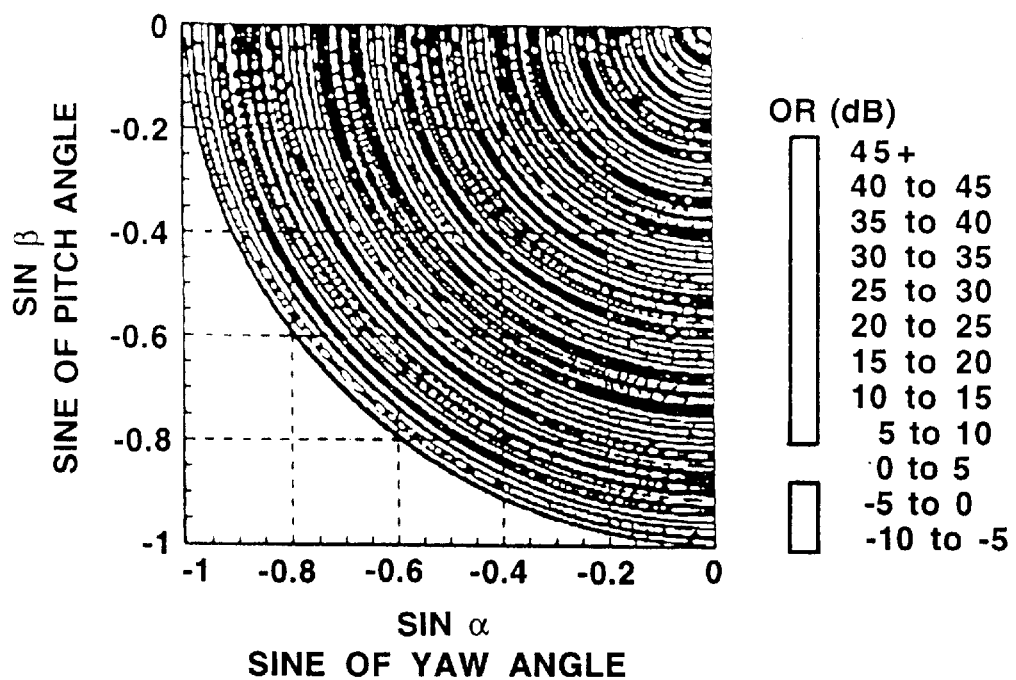
FIG. 3C illustrates application of 2-Channel OR algorithm to a large amplitude monopulse antenna (Currie and Brown Aperture)

The previous discussion presented the characteristics of monopulse antenna patterns in the principal planes (planes of the differences). However, indication of an off-axis source is an issue over the entire field of view of a radar antenna, including backlobe regions. FIGS. 3A and 3B present spectral distribution charts showing the ratio of difference channel response to sum channel response over a quadrant of the forward hemisphere for the Currie and Brown aperture at 94 GHz with 0.75" blockage introduced to approximate prime focus blockage effects. The spatial region sample rate is approximately 6 points per beamwidth. In first regions of the Figures, the sum pattern is at least 5 dB above the difference. In second regions, the sum is slightly greater than the difference. In third regions, the difference pattern is 0 to 5 dB greater than the sum (the third regions in the lower left corners of the Figures are outside the forward hemisphere of the antenna). All other levels indicate the difference is significantly greater than the sum. As seen in FIGS. 3A and 3B, the difference pattern is substantially below the sum over approximately half of the forward hemisphere and the diagonal plane (225 degrees off the sin α-axis, here) is relatively ambiguous in level. It is obvious that by comparing pitch difference to sum and, independently, yaw difference to sum, a moderately successful indication of an off-axis source can be achieved (we refer to this as OR processing). That is, a pitch to sum comparison pretty well identifies an off-axis source in the pitch plan and maintains a sufficiently large ratio out to about 30 degrees off the pitch plan for a high probability of identification and similarly for the yaw channel. As the differences derive from the sum, a high incidence of null alignment can be expected near the 45 degree plane, and no significant reinforcement is expected using the OR process. A spectral density plot illustrating the use of OR processing for sidelobe indication is shown in FIG. 3C for an amplitude monopulse antenna. The plot represents the OR as the greater of pitch to sum and yaw to sum ratios plotted in dB. Again, first and second regions identify regions in which the sum always exceeds the differences and third regions identifies regions in which the difference pattern exceeds the sum by 5 dB or less. As expected, the 45-degree plane is not well covered.

Figure 3D:
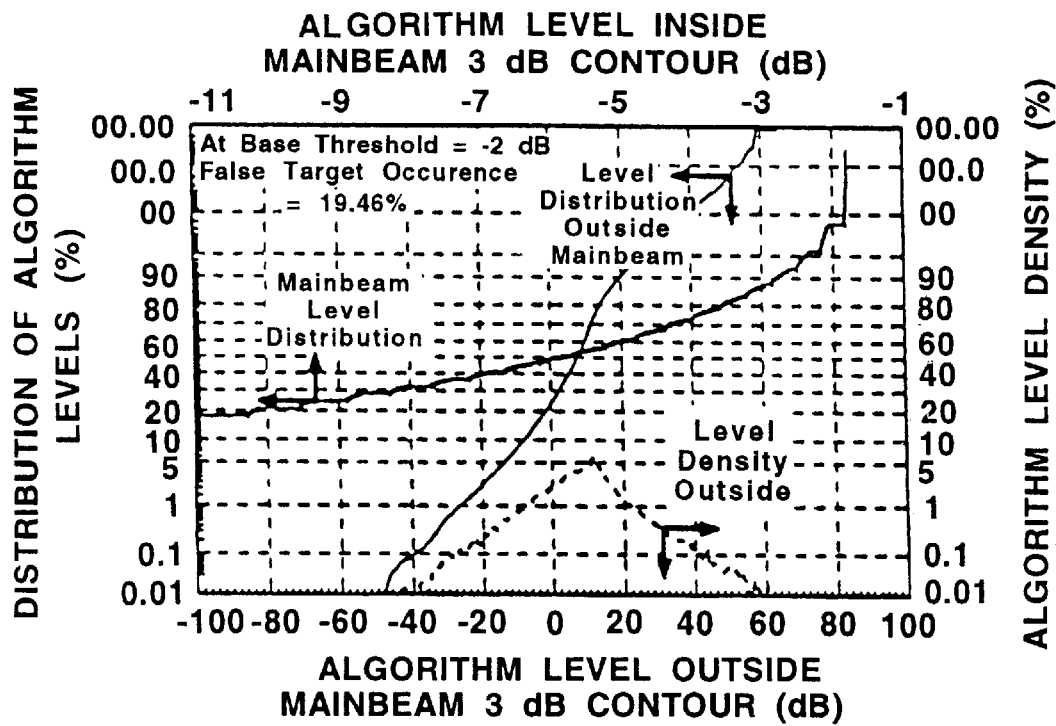
FIG. 3D illustrates the 2-Channel OR algorithm density and distribution functions (Currie and Brown Aperture)

An alternate representation of OR data is shown in FIG. 3D. A trace of the FIG. 3D shows the density of ratio level occurrence throughout the forward hemisphere, excluding the region within the sum beam 3-dB contour. A second trace shows the distribution of level occurrence outside the mainbeam. The third trace shows the percentage of the mainbeam 3-dB region area that is covered by ratio levels at and below the value on the abscissa. The next largest integer to the ratio level for 100% mainbeam coverage is taken as the base threshold for the system. At the base threshold level of −2 dB for the OR algorithm, the distribution function trace shows that the algorithm declares a signal arriving from a sidelobe direction to be a mainbeam target 19.46% of the time. For these traces, the quadrant is sampled at about 7 points per mainbeam beamwidth outside the sum beam 3-dB contour, and at about 7800 points within the sum beam 3-dB contour.

Figure 3E:
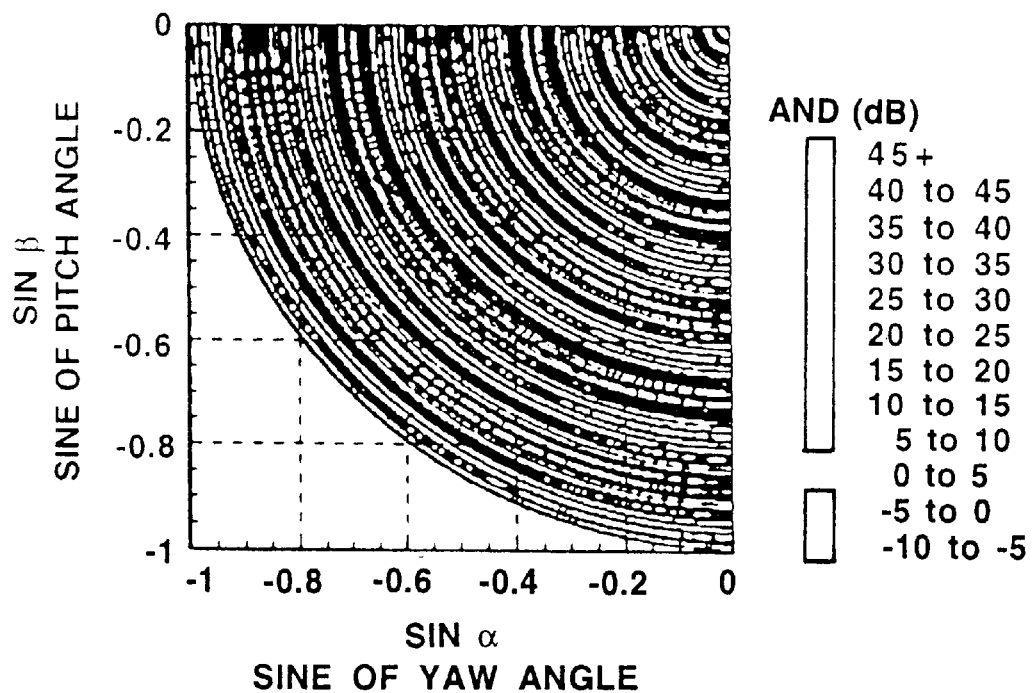
FIG. 3E illustrates application of 2-Channel AND algorithm to a large amplitude monopulse antenna (Currie and Brown Aperture)

If the square roots of the difference to sum power ratios are added (linear addition of electric field quantities is an AND process) rather than Ored, a small improvement in coverage is obtained in and around the 45-degree plan without significantly changing the distribution within the mainbeam 3-dB region. The base thresholds for the AND or OR algorithms are at the 95% level for mainbeam coverage and the AND algorithm declares a signal arriving from a sidelobe direction to be a mainbeam target 21.17% of the time. AND algorithm data is shown with the spectral density plot in FIG. 3E and in the distribution traces in FIG. 3F. Neither the OR nor AND algorithm offers a very robust approach to sidelobe indication for radars with large amplitude monopulse antennas.

The spectral density plots for the 2-channel algorithms indicate that neither fills the intercardinal plane well. In both cases, the individual difference patterns fall off rapidly as the null plane is approached, and the reinforcement provided by either comparison method is insufficient to achieve robust sidelobe indication.

Figure 3F:
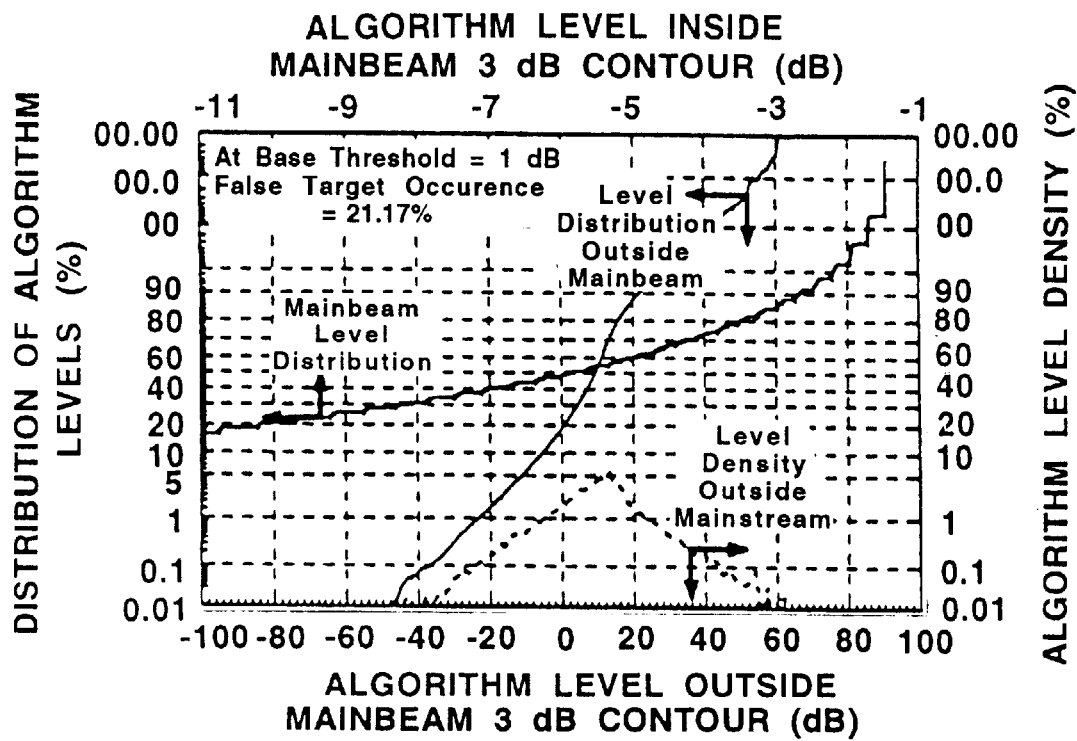
FIG. 3F illustrates 2-channel AND algorithm density and distribution functions (Currie and Brown Aperture)
Figure 3G:
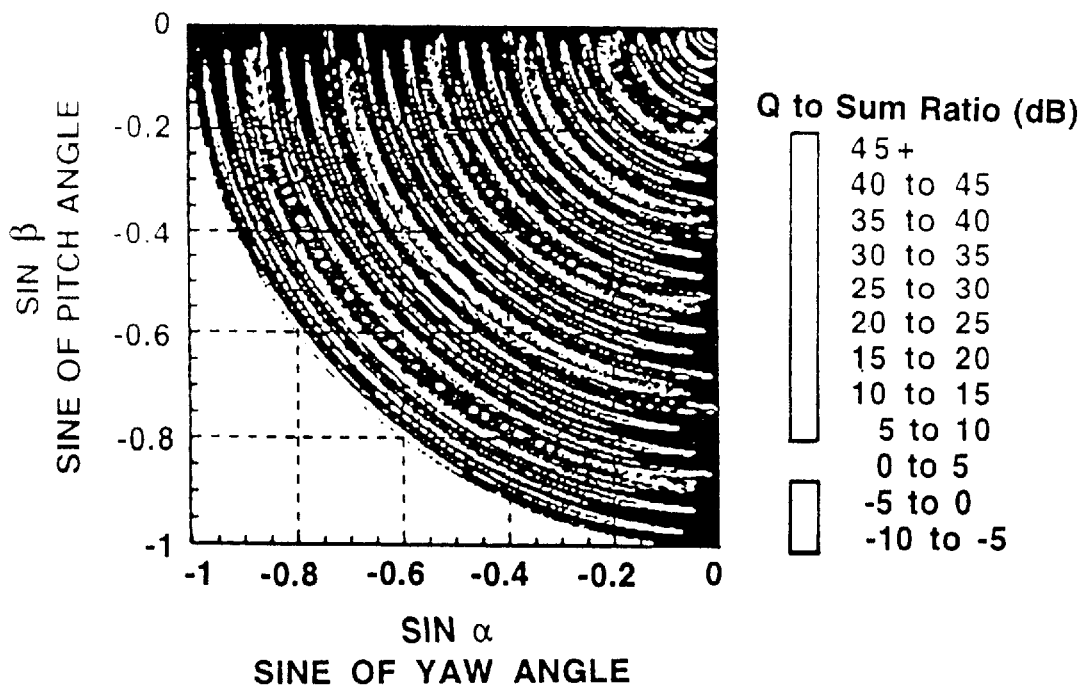
FIG. 3G illustrates the Q to sum ratio for an amplitude monopulse antenna (Currie and Brown Aperture)

Each tracking difference pattern of a monopulse antenna is antisymmetric with respect to a single plane. The two planes of antisymmetry contain the antenna phase center and are, in absence of noise and antenna manufacturing error, spatially orthogonal. Tracking difference patterns are functionally orthogonal to the sum pattern. As discussed in the previous section, the Q-channel is an additional port of a classical monopulse network that supports a fourth orthogonal response with a pattern that has a pair of null planes that are spatially orthogonal and coincident with the null planes of the tracking difference patterns. Q-channel patterns have high sidelobe ridges in the intercardinal planes as shown in FIG. 3G over a quadrant of the forward hemisphere. Q-channel response is functionally orthogonal to the other three channels of the monopulse network.

If the Q-channel response magnitude is added to the AND algorithm, the weak response in the intercardinal planes is reinforced, resulting in significantly improved sidelobe indication without adversely effecting system sensitivity in the mainbeam region. The new algorithm is given as:

$$A_1 = \{|\Delta_{az}| + |\Delta_{el}| + |Q|\}/|\Sigma| \qquad \text{Eq. 1}$$

Where $\Sigma$ denotes a sum channel response, $\Delta$ denotes a difference channel response and $|\ |$ denotes magnitude only. The latter is implemented in digital signal processor 128.

Figure 3H:
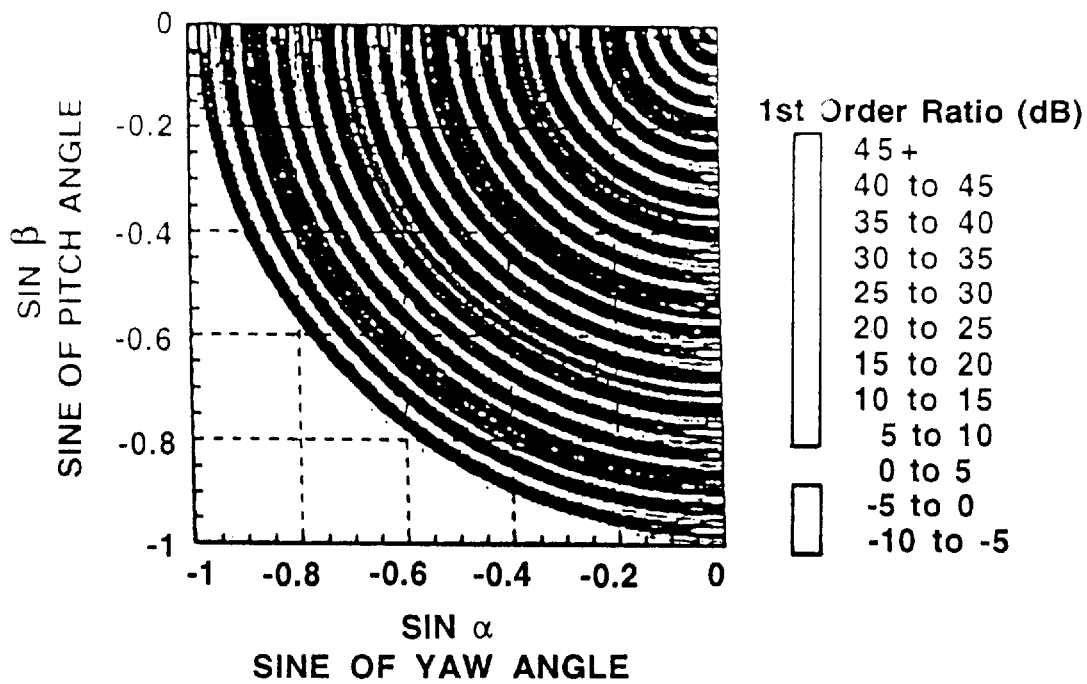
FIG. 3H illustrates application of First Order Algorithm to a Large Amplitude Monopulse Antenna (Currie and Brown Aperture)
Figure 3I:
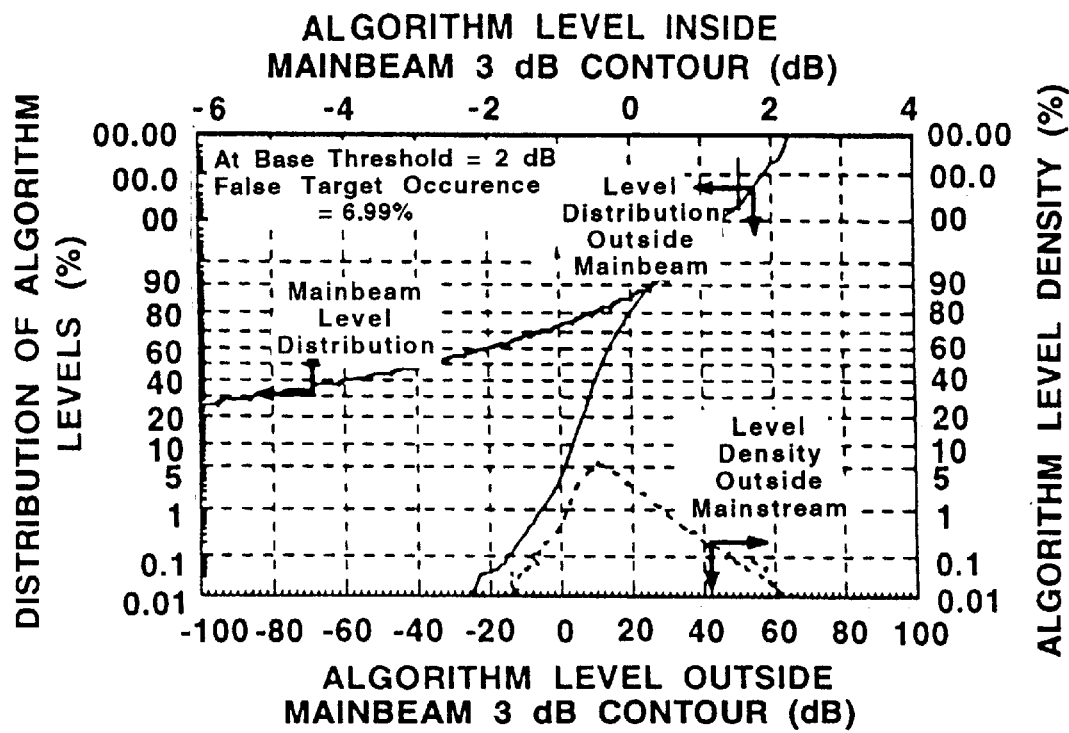
FIG. 3I illustrates first order algorithm density and distribution functions (Currie and Brown Aperture)

The significant improvement in sidelobe indication that can be achieved with the new algorithm is illustrated in FIGS. 3H and 3I for the same large amplitude monopulse antenna considered previously. For historical reasons, this algorithm is referred to as the First Order Algorithm. Comparison of FIG. 3D, FIG. 3F and FIG. 3I shows that relative to the AND or OR algorithms, the First Order Algorithm produces a significant reduction in the spectral density plot area associated with sum response dominance or near equality. The traces in FIG. 3I further emphasize the improvement wherein the addition of the Q-channel response increases sidelobe indication probability to 93.01% for 2 dB base threshold.

It should now be appreciated a significant improvement over state of the art performance in sidelobe indication probability is offered by the First Order Algorithm.

As described herein above, the typical monopulse implementation adds and subtracts the responses in four ports, each port corresponding to an independent beam emanating from a single center, as in amplitude monopulse, or to an independent phase center, as in phase monopulse. If the response amplitude for each beam or the response amplitude for each monopulse channel is available to the signal processor, an alternate sidelobe indication algorithm with even better performance can be constructed.

An objective of the present invention is to seek methods of reducing or eliminating nulls in the combined difference channel sidelobe response. The First Order Algorithm only partially succeeds in this regard because aperture symmetry is maintained in some sense for each of the difference responses, that is, sidelobe region nulls retain a concentric relation to the aperture phase center for all four channels. It is therefore clear that a method of decorrelating difference response sidelobe nulls while maintaining difference response nulls over the aperture phase center is to pair the beams asymmetrically, then add magnitudes of these new responses and compare the summation to the sum pattern.

Figure 3J:
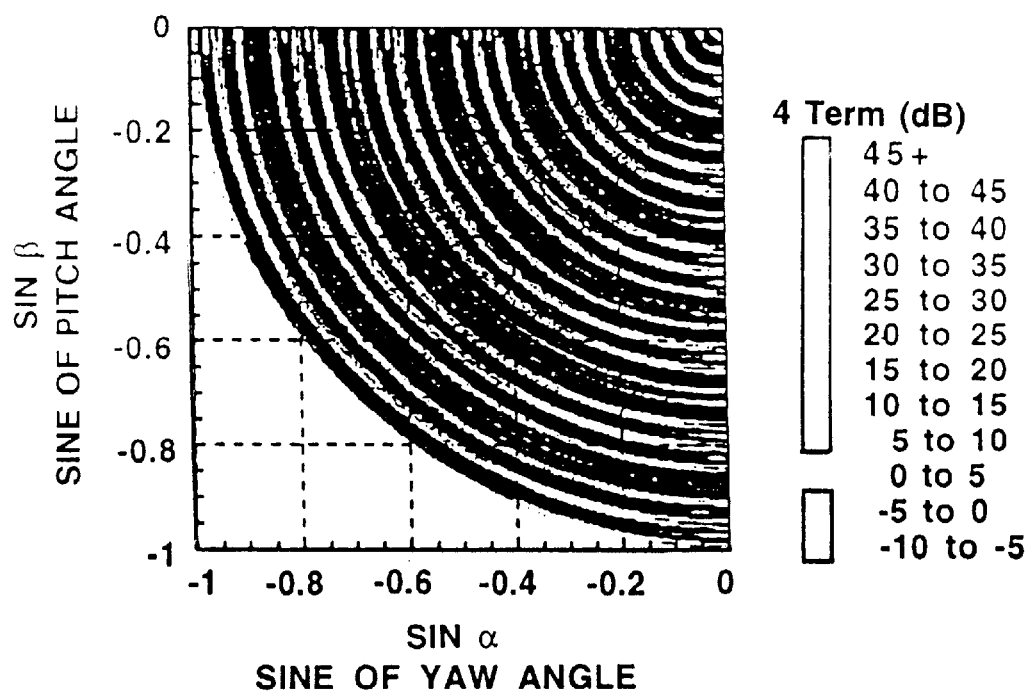
FIG. 3J shows application of four term algorithm to a large amplitude monopulse antenna (Currie and Brown Aperture)
Figure 3K:
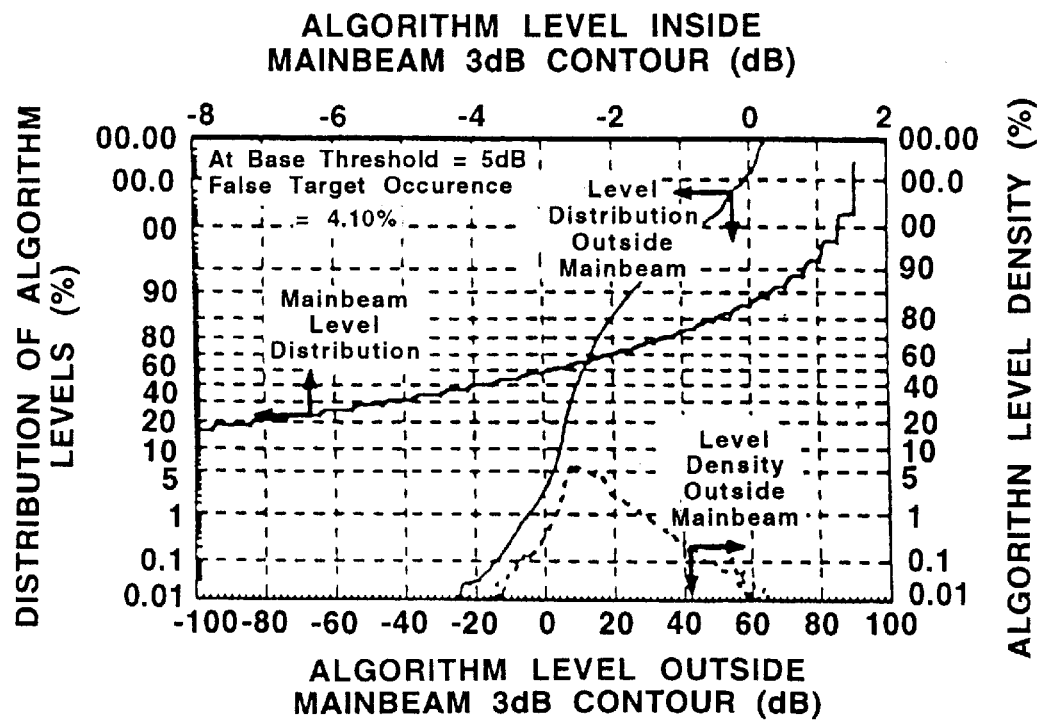
FIG. 3K shows Four Term Algorithm Density and Distribution Functions (Currie and Brown Aperture)

Results for the simplest and, it turns out, most effective application of multibeam sidelobe indication algorithm are shown in FIGS. 3J and 3K. The algorithm, which is known as a Four Term Algorithm, produces a 96.7% probability of sidelobe indication for 96.3% mainbeam coverage at a base threshold of 1 dB. The algorithm is constructed by forming differences of the four possible combinations of contiguous beam pairs, comparing the magnitudes of these differences to the sum pattern magnitude and summing the result. That is, let the constituent beams (or antenna quadrant phase centers for phase monopulse antennas) be numbered sequentially about the antenna phase center beam. The responses are then $B_1$, $B_2$, $B_3$ and $B_4$, and the sum pattern is given by $$\Sigma = B_1 + B_2, + B_3 + B_4 \qquad \text{Eq. 2}$$

The four term algorithm is given by $$A_4 = \{|B_1 - B2| + |B_2 - B_3| + |B_3 - B_4| + |B_4 - B_1|\}/|\Sigma| \qquad \text{Eq. 3}$$

It should be appreciated the improvement over state of the art performance in sidelobe indication probability offered by the Four Term Algorithm is very significant.

Figure 3L:
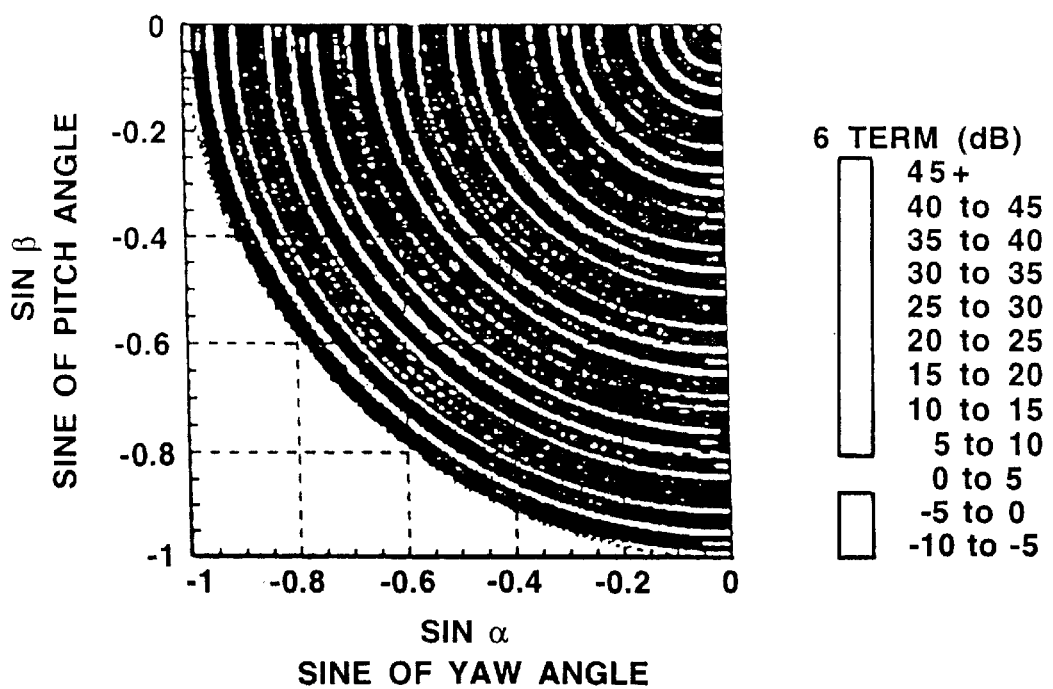
FIG. 3L illustrates applications of Six-Term Algorithm to a Large Amplitude Monopulse Antenna (Currie and Brown Aperture)
Figure 3M:
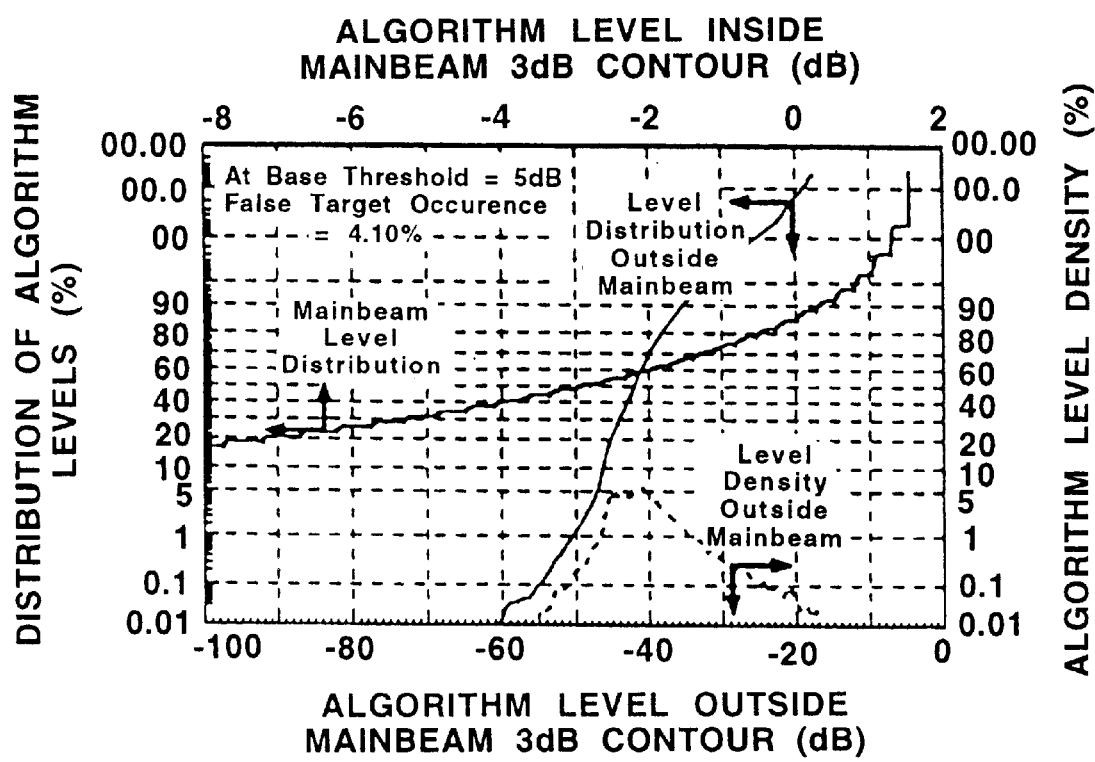
FIG. 3M illustrates six term algorithm density and distribution functions (Currie and Brown aperture)

The success of the Four Term Algorithm prompted an investigation of a Six Term Algorithm which adds $|B_1 - B_3| + |B_2 - B_4|$ to $A_4$. Application of the Six Term Algorithm is shown in FIGS. 3L and 3M. The Six Term Algorithm does an excellent job of pushing up the ratio in all regions, but also results in a significant increase in base threshold. The net result is slightly poorer performance than is obtained with the Four Term Algorithm.

Provided the four complex outputs of the monopulse network are maintained at RF or at IF, the individual beam responses can be reconstructed with simple arithmetic operations. Let the monopulse outputs be $\Sigma$, $\Delta_{az}$, $\Delta_{el}$ and Q. For both amplitude and phase monopulse systems, the pattern functions are formed as $$\Sigma = B_1 + B_2 + B_3 + B_4 \qquad \text{Eq. 4}$$

$$\Delta_{az} = B1 - B2 - B_3 + B_4 \qquad \text{Eq. 5}$$

$$\Delta_{el} = B_1 + B_2 - B_3 - B_4 \qquad \text{Eq. 6}$$

$$Q = B_1 - B_2 + B_3 - B_4 \qquad \text{Eq. 7}$$

By inspection, we can write equations for $B_1$, $B_2$, $B_3$, and $B_4$.

$$B_1 = 0.25 * (\Sigma + \Delta_{az} + \Delta_{el} + Q) \qquad \text{Eq. 8}$$

$$B_2 = 0.25 * (\Sigma - \Delta_{az} + \Delta_{el} - Q) \qquad \text{Eq. 9}$$

$$B_3 = 0.25 * (\Sigma - \Delta_{az} - \Delta_{el} + Q) \qquad \text{Eq. 10}$$

$$B_4 = 0.25 * (\Sigma + \Delta_{az} - \Delta_{el} - Q) \qquad \text{Eq. 11}$$

At this point, either the First Order Algorithm or the Four Term Algorithm becomes available to the system. The selection then depends on system thermal noise and signal processor calculations noise issues.

Selection of the off-axis indicator threshold is a process that considers not only the desired probability of correct off-axis indication, but also the overall system probability of detection for legitimate mainlobe targets. The off-axis indicator algorithm is applied to detections produced by the CFAR process, such as would be implemented in a coherent pulse Doppler radar to process the range, Doppler output of the radar's processor. The off-axis indicator thus represents a second detection threshold; those signals which are less than the off-axis threshold are declared detections, while those that are above the threshold are declared off-axis and discarded. To be detected, a signal must not only be above the normal CFAR threshold, but also below the off-axis indicator threshold. It is the joint probability that a mainlobe signal is above the CFAR threshold and below the off-axis indicator threshold that defines the overall system probability of detection when the off-axis algorithm is implemented. When selecting the off-axis threshold, one would like the threshold to be low so as to give a positive off-axis indication over as much angle space outside the mainbeam as possible, but not so low as to reject a significant portion of the mainlobe returns (for purposes of this discussion, mainlobe return means any signal having angle of arrival within the 3 dB one way contour of the Sum mainlobe pattern).

The CFAR detection threshold is normally selected to achieve a desired single look false alarm probability on noise alone. The combination of desired detection and false alarm probability then sets the signal to noise ratio required to meet those two system performance parameters. The radar transmit power required to meet the signal to noise ratio factors in a beamshape loss which assumes that a target is equally likely anywhere within the mainbeam of the radar; the beamshape loss is calculated by averaging the two way sum pattern gain over the mainlobe region, with the mainlobe region taken to be that within the 3 dB one way gain contour of the mainbeam. Curves of detection probability versus signal to noise ratio with false alarm probability as parameter are available in a host of radar textbooks.

When calculating the overall probability of detection with off-axis indication, not only must the signal to noise ratio as a function of beam position be factored into the equation, but also the value of the off-axis indicator within the mainbeam. The overall probability of detection is the joint probability of three events:

$$P_{det} = P(\text{mainlobe detection, CFAR detection, mainbeam position}) \quad \text{Eq. 12}$$

where
mainlobe detection=probability that the off-axis indicator for a mainlobe signal is below the off-axis indicator threshold in the presence of receiver noise
CFAR detection=probability that the mainlobe signal exceeds the CFAR detection threshold in the presence of receiver noise
mainbeam position=probability that the mainlobe signal is at a given angular position within the mainbeam (taken to be uniformly distributed within the mainbeam)

The normal detection probability without off-axis processing as discussed above is the joint probability of CFAR detection and mainbeam position, with the dependence on mainbeam position included by factoring in a beamshape loss factor.

The probability of detection with off-axis processing is relatively easy to calculate if the above joint probability is broken down into its constituent components. Using Bayes rule, the detection probability can be expressed as the product of the beam position and two conditional probabilities:

$$\begin{aligned}P_{det} &= P(CFAR \text{ detection, mainbeam position}) \times \\ &\quad P(\text{mainlobe detection} | CFAR \text{ detection, mainbeam position}) \\ &= P(\text{mainbeam position}) \times P(CFAR \text{ detection} | \\ &\quad \text{mainbeam position}) \times P(\text{mainlobe detection} | \\ &\quad CFAR \text{ detection, mainbeam position})\end{aligned} \quad \text{Eq. 13}$$

The first conditional probability in the above expression, P(CFAR detection|mainbeam position), is the signal to noise dependent detection probability (for a given false alarm probability) characterized by the detection curves commonly found in radar texts. When integrated over the mainbeam, the product of the above conditional probability and the first term in the above expression, P(mainbeam position), provides the detection probability when off-axis indication is not implemented (i.e., the normal system CFAR detection performance including the effects of beam shape loss). The second conditional probability in the above expression, P(mainlobe detection|CFAR detection, mainbeam position), thus represents the contribution of off-axis processing to the overall system detection probability. The effect of off-axis processing on detection probability is thus readily evident; since probabilities are always less than or equal to one, the penalty for implementing off-axis processing is a reduction in overall system detection probability by a factor equal to the value of P(mainlobe detection|CFAR detection, mainbeam position).

Further reflection on the dependence of the above two conditional probabilities on beam position reveals that the two "work" together to minimize the detrimental effects of off-axis processing. Consider first P(CFAR detection|mainbeam position). The probability of CFAR threshold crossing as a function of signal to noise ratio is typically a steep curve; a change of several dB in signal to noise ratio can produce a dramatic change in detection probability, especially for relatively small signal to noise ratio (10 dB or less). The two way gain at the edge of the beam is 6 dB less than it is at the center of the beam. Therefore, when the product of P(mainbeam position) and P(CFAR detection|mainbeam position) are integrated near the edge of the mainbeam, little is added to the overall system detection probability; most of the detection probability accumulates from a region closer to the center of the mainbeam. Now consider the dependence of P(mainlobe detection|CFAR detection, mainbeam position) on beam position. The off-axis indicator algorithms described in this invention disclosure work by considering the relation between the difference channel signals and the sum channel signal. Fundamentally, when one or more of the difference channel signal levels are significant in relation to the sum channel signal level, an off-axis indication is given. Within the mainbeam, the region where one or more of the difference channel signals is likely to be significant in relation to the sum channel signal is near the edge of the mainbeam; that is, difference channel signal plus noise is most likely to be comparable in magnitude to sum channel signal plus noise near the edge of the main beam. P(mainlobe detection|CFAR detection, mainbeam position) is small when signal plus noise in one or more of the difference channels is comparable to signal plus noise in the sum channel (i.e., the signal has a high probability of being identified as off-axis and rejected). Therefore P(mainlobe detection|CFAR detection, mainbeam position) is small near the edges of the mainbeam and greatest near the center, the region where off-axis processing tends to generate the greatest penalty is near the edges of the mainbeam, which is also the region where there is not much CFAR detection performance. Significant off-axis rejection can be achieved with fairly minor impact on overall system probability of detection.

A MATLAB computer simulation was written to evaluate the probability of off-axis indication and mainlobe detection for a 94 GHz seeker design example taken from the text "Principles and Applications of Millimeter-Wave Radar" by Currie and Brown, 1987 Artech House. The design example (see pages 663 to 680 in Currie and Brown) is for 10 dB signal to noise ratio, and false alarm probability of $10^{-4}$. The simulation has been used to evaluate detection performance for three algorithms; the first is the two channel OR technique currently in use in some missile systems, while the second and third are the first order and four term algorithms described herein. The three algorithms are summarized below:

Two channel OR Algorithm—

$$\text{Off-Axis Indication when } \frac{|\Delta_p|}{|\Sigma|} \text{ OR } \frac{|\Delta_y|}{|\Sigma|} \geq \text{Threshold} \quad \text{Eq. 14}$$

First Order Algorithm—

$$I = \frac{|\Delta_p|}{|\Sigma|} + \frac{|\Delta_y|}{|\Sigma|} + \frac{|Q|}{|\Sigma|} \quad \text{Eq. 15}$$

Off-Axis Indication when $I \geq$ Threshold

Four Term Algorithm—

$$\Sigma = B_1 + B_2 + B_3 + B_4 \quad \text{Eq. 16}$$

$$I = \left(\frac{|B_1 - B_2| + |B_2 - B_3| + |B_3 - B_4| + |B_4 - B_1|}{\Sigma}\right) \quad \text{Eq. 17}$$

In the above expressions, $\Delta_p$, $\Delta_y$, $\Sigma$, and Q are the pitch, yaw, sum, and quadrupole channels, respectively. Note the above expressions are sometimes also referred to as $\Delta_{el}$, $\Delta_{az}$, $\Sigma$ and Q. $B_1$, $B_2$, $B_3$, and $B_4$ are the four monopulse beams used to construct the $\Sigma$, $\Delta_p$, $\Delta_y$ and Q signals. The results are summarized in FIGS. 4A, 4B and 4C for the above three algorithms, respectively. The left plot in each figure shows the probability of off-axis indication as a function of off-axis detection threshold, while the right plot shows the probability of detection as a function of off-axis threshold for mainlobe signals. The left plot is therefore a measure of the algorithm's effectiveness in identifying off-axis signals, while the right plot is a measure of the algorithm's impact on mainlobe detection performance. Two curves are shown on the mainlobe detection plot: probability of detection with and without off-axis processing. Note in every case that as the threshold increases, the probability of detection with off-axis processing eventually equals that without off-axis processing. The above result is expected, because as threshold increases, it becomes less likely that an off-axis indication will be given, thus increasing P(mainlobe detection|CFAR detection, mainbeam position). When P(mainlobe detection|CFAR detection, mainbeam position) approaches 1, the detection probability with off-axis processing approaches that obtained with CFAR processing alone.

Figure 4A:
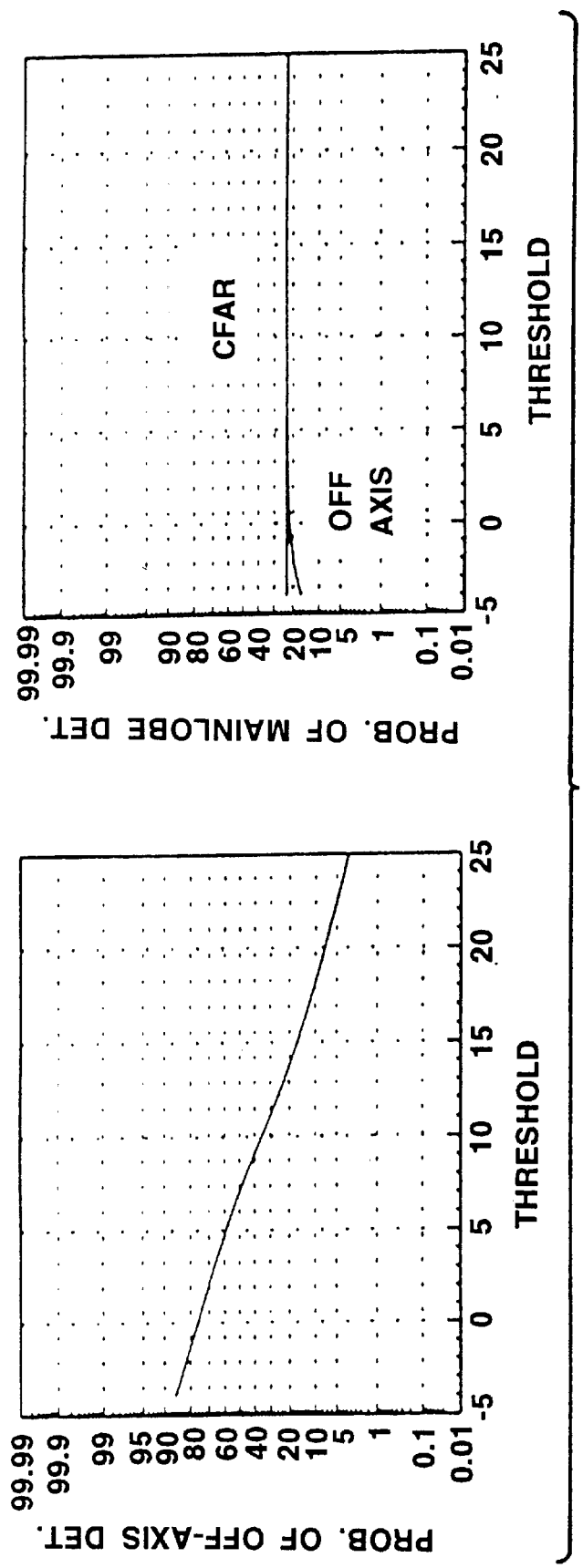
FIG. 4A illustrates off-axis and mainbeam detection performance, 10 dB SNR at beam center, 2 channel OR Algorithm.

FIG. 4A summarizes the performance of the two channel OR algorithm applied to the design example taken from Currie and Brown. Referring to the right hand plot of FIG. 4A, when the off-axis threshold is 2 dB, the mainlobe detection probability is essentially that obtained with CFAR processing alone, while the probability of correctly identifying off-axis signals (left plot) is about 70%.

Figure 4B:
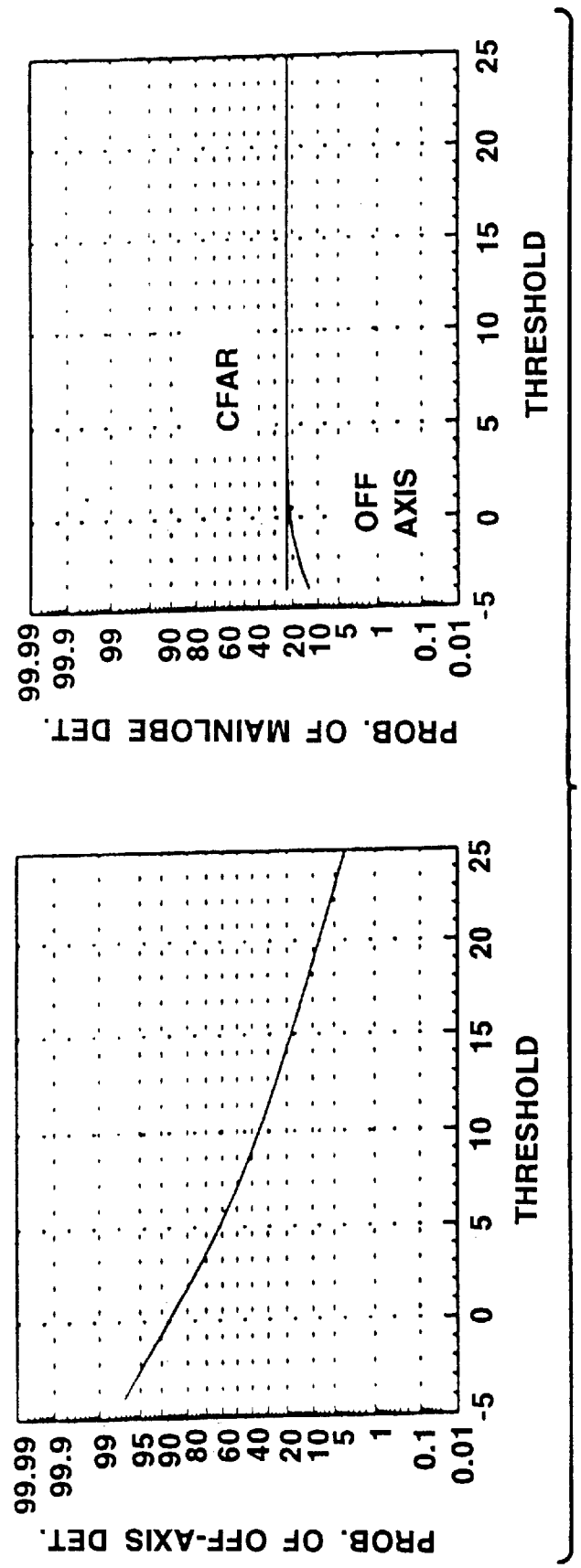
FIG. 4B shows off-axis and mainbeam detection performance, 10 dB SNR at beam center, first order algorithm.

Referring to FIG. 4B, it can be seen that the probability of off-axis detection for the first order algorithm exceeds 88% for thresholds less than or equal to 5 dB. A 5 dB threshold, referring to the probability of mainlobe detection curve, is also about where the CFAR and off-axis detection performance become equal. With a 5 dB threshold, off-axis signals can be identified with 88% probability while incurring only a small loss in mainlobe detection probability. If one is willing to incur a slightly larger loss in mainlobe detection probability, a threshold of 3 dB produces off-axis identification performance of about 94%.

Figure 4C:
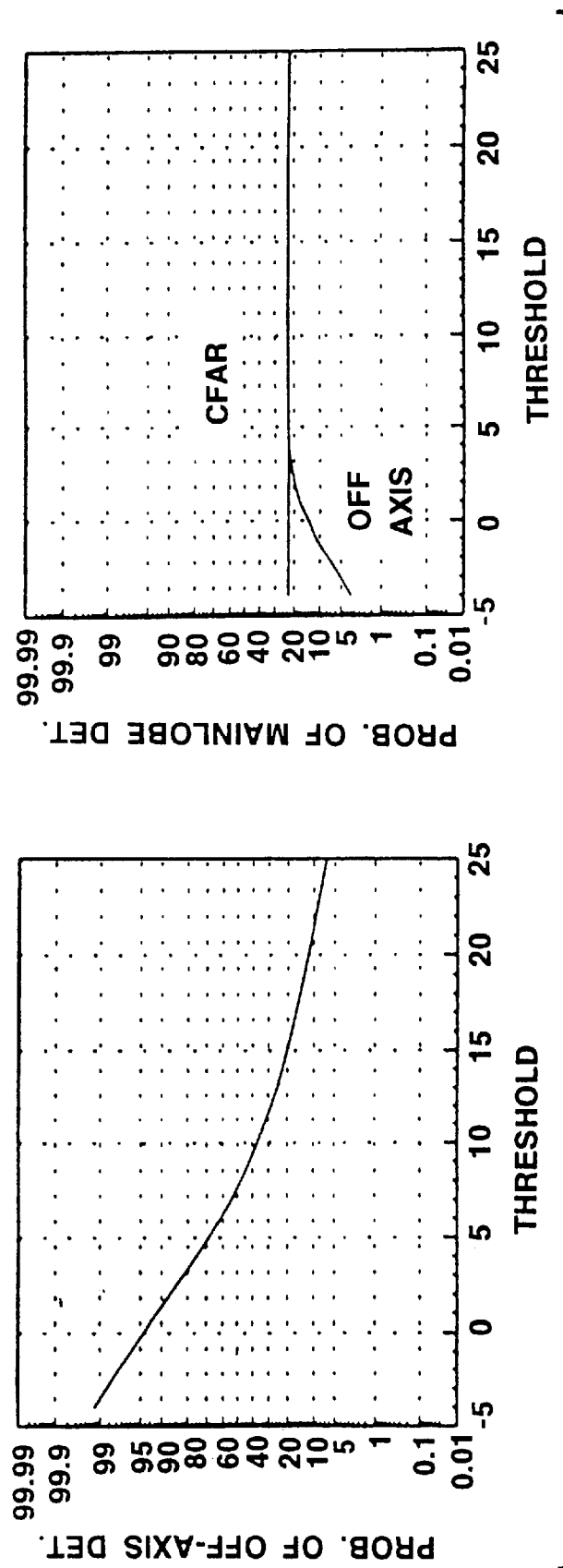
FIG. 4C shows off-axis and mainbeam detection performance, 10 dB SNR at beam center, four term algorithm.

FIG. 4C summarizes the performance of the four term algorithm. An off-axis detection threshold of 7 dB results in a minor loss in mainlobe detection performance, while producing off-axis identification performance of about 88%. If slightly greater loss in mainlobe detection performance can be tolerated, a threshold of 5 dB produces off-axis identification performance of about 94%.

Figure 5:
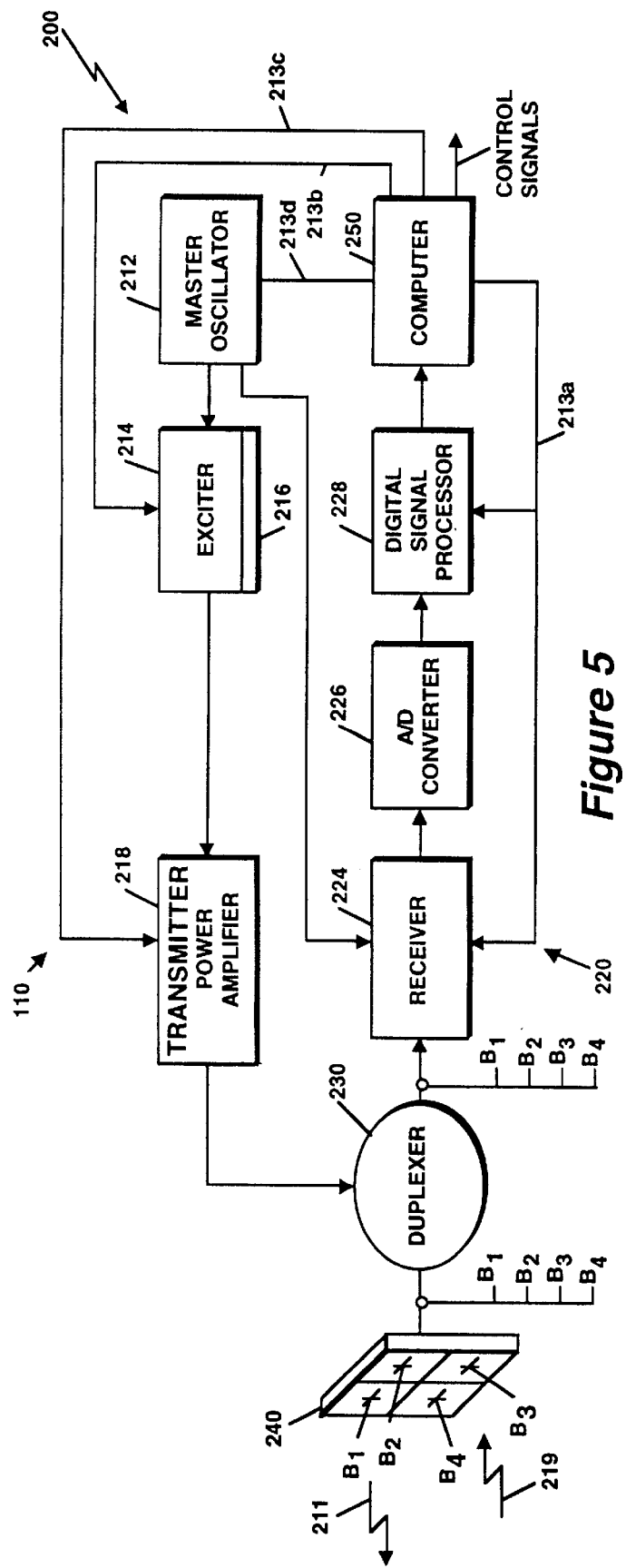
FIG. 5 is a block diagram of an alternative radar system incorporating the present invention.

Referring now to FIG. 5, there is shown a block diagram of a radar system 200 comprising a computer 250, a master oscillator 212, transmitter 210, a receiver 220, a duplexer 230 and a monopulse antenna 240. The transmitter 210 includes an exciter 214, exciter control circuitry 216 and a transmitter power amplifier 218. The receiver 220 includes a receiver 224, analog-to-digital (A/D) converter 226, a digital signal processor 228 including an off-axis indicator according to the present invention. The system of FIG. 5 represents a pulse radar system, although it is to be understood that the present invention may be adapted for use in other systems.

The computer 250 provides reference signals 213a–213d to provide the various components of the radar system 200 the requisite control signals as described hereinafter. In a conventional manner, the master oscillator in response to the computer 250 provides a signal to the exciter 214 which in turns provides an RF signal at the output thereof. The RF signal is then fed to the transmitter power amplifier 218 where RF signal is amplified, and via duplexer 230, is fed to antenna 240 and transmitted as a transmit signal 211. The antenna 240 is a monopulse antenna. As antenna 240 scans the search area, a received signal 219 is reflected by objects within the operating range of the radar system 200. Received signal 219 is then received by antenna 240. Received signal 219 is fed from the antenna 240, via duplexer 230, to the receiver 224 which in turn heterodynes the received signal with a signal from the master oscillator 212 to produce baseband signals. The baseband signals is fed to the A/D converter 226 in turn produces discrete time samples of the baseband signals, as sampled baseband signals which is fed to the digital signal processor 228. In accordance with the present invention, the digital signal processor 228 then performs computational processing as described herein and additional analysis such as a discrete Fourier transform to determine Doppler frequencies and other information of interest in a manner as described. The latter is then fed to the computer 250 to provide control signals to control a vehicle as well as the various components of the radar system 210. It is to be understood that while digital signal processor 228 and computer 250 are shown separately, a single computer may be alternatively used or a combination of multiple computers and digital signal processors may be used.

The radar system 200 is arranged to capture the received signal 219 using the four quadrants of the monopulse antennna 240 to produce quadrant signal $B_1$, quadrant signal $B_2$, quadrant signal $B_3$, and quadrant signal $B_4$. The respective signals, $B_1$, $B_2$, $B_3$, and $B_4$ from each of the four quadrants are coupled to the receiver 224 where each of the four signals are respectively heterodyned with a signal from the master oscillator 212 to produce four baseband signals. Each of the four base band signals are fed to the A/D converter 226 which in turn produce discrete time samples of each of the four baseband signals which are then fed to the digital signal processor 228. Having fed four digital signals indicative of the four quadrant signals $B_1$, $B_2$, $B_3$, and $B_4$ to the digital signal processor 228, the digital signal processor 228 can now perform monopulse arithemetic to produce the necessary monopulse signals $\Sigma$, $\Delta_{az}$, $\Delta_{el}$ and Q. Using the First Order Algorithm as described hereinabove, the digital signal processor 228 is able to produce an Off-Axis Indication when $I \geq$ a defined threshold. The digital signal processor 228 is also able to produce the Off-Axis Indication using the Four Term Algorithm as described when $I \geq$ defined threshold. Furthermore by adding $|B_1-B_3|+|B_2-B_4|$ to $A_4$, the digital signal processor can also provide a Six Term Algorithm, if needed.

It should now be appreciated that using the above described technique, an off-axis indication can be obtained by forming a respective digital signal indicative of a signal from each quadrant of a monopulse antenna; forming a sum signal indicative of a combined signal from all quadrants of the monopulse antenna and deriving a magnitude of said sum signal; forming difference signals of each possible combination of signals from each quadrant of the monopulse antenna and deriving a magnitude of each of the respective difference signals; comparing the magnitude of each of the difference signals to a magnitude of the sum signal; summing any result; and comparing the result with a threshold value such that when the threshold value is exceeded an of-axis indication is provided.

Figure 6:
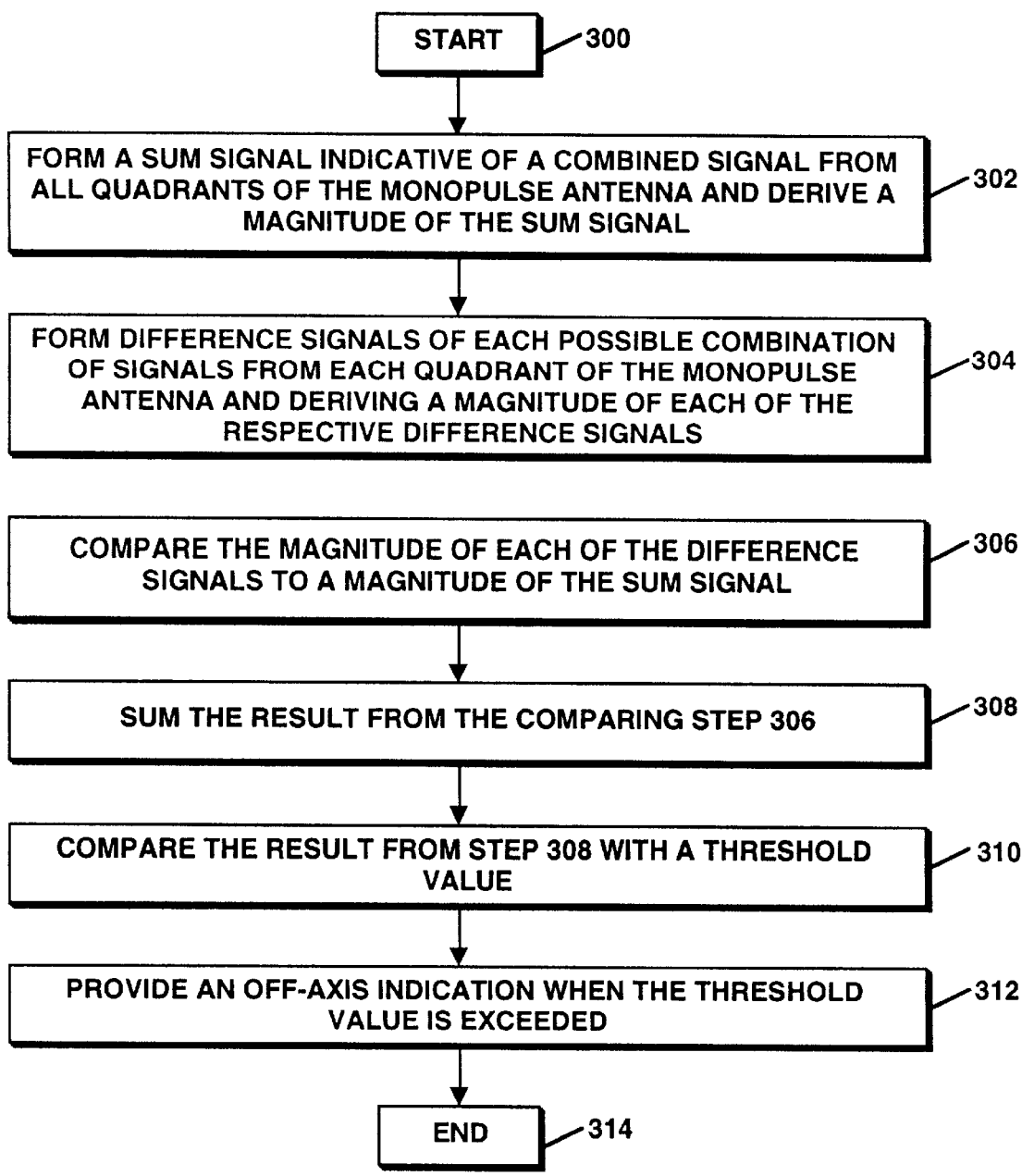
FIG. 6 is a flow diagram of an alternative radar system incorporating the present invention.

Referring now to FIG. 6, a flow diagram to implement the technique described above using digital signal processor 128 and computer 150 is shown. After the radar system 200 provides digital signals indicative of each of the quadrant signals to the digital signal processor 128, a subroutine is initiated at step 300. In processing step 302, a form a sum signal indicative of a combined signal from all quadrants of the monopulse antenna and derive a magnitude of the sum signal step is performed to obtain the magnitude of the sum signal. Next a form difference signals of each possible combination of signals from each quadrant of the monopulse antenna and deriving a magnitude of each of the respective difference signals processing step 304 is performed to obtain the magnitude of each of the difference signals. Next a compare the magnitude of each of the difference signals to a magnitude of the sum signal processing step is performed to obtain the ratio of the magnitudes of each of the difference signals to the magnitude of the sum signal. Next a sum any result from the comparing step 306 processing step is performed to obtain an off-axis indication signal. In processing step 310, the summing result is compared with a threshold value and in processing step 132 and Off-Axis Indication is provided when the summing result exceeds the threshold value. The subroutine then comes to an end at step 314 until it is called again.

It should now be appreciated that the inventive concept is the realization that by including the information in the difference channels of the monopulse radar in the detection decision process, off-axis indication with high probability can be achieved with little or no impact on the detection probability of mainlobe signals. Normally, only the magnitude of the Sum channel signal is used in making detection decisions. Use of only Sum magnitude data ignores useful information contained in the difference channels that is relevant to the detection decision process. The algorithms described are implemented in two ways. The first is with the Sum and three difference signals (pitch, yaw, and quadrupole, or diagonal difference) commonly available from a monopulse network. The second is with the quadrant patterns directly. In most fielded systems, the monopulse signals are formed at microwave. Alternatively, it is preferable to bring back the quadrant patterns directly to form the monopulse patterns digitally. With both of the above methods, the algorithms are implemented in a computationally simple way which allows off-axis detection probability to be traded versus mainlobe detection probability with signal to noise ratio as parameter. This novel implementation of the algorithms allows simple programmable control of the above two performance parameters. One can thus achieve the required level of system performance as a function of signal to noise ratio, analogous to the currently accepted practice of controlling detection and false alarm probability as a function of signal to noise ratio with the CFAR threshold.

All references made herein are hereby incorporated by reference in their entirety.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

We claim:

1. A radar system comprising a system for use in a monopulse radar to determine whether a signal is arriving from a direction corresponding to the pointing direction of an antenna main beam, or from a direction corresponding to directions covered by antenna sidelobes, the system comprising:

a first circuit to provide a signal indicative of information contained in all monopulse channels as well as signals indicative of information contained in each respective monopulse channel; and a second circuit to utilize the signals provided by the first circuit to eliminate off-axis detections with a relatively minor loss in mainlobe detection probability wherein the first and second circuits cooperate to incorporate monopulse data to reject off-axis signals which are of sufficient strength to pass a CFAR detection threshold.

2. A radar system comprising:

an antenna having four quadrants, each quadrant capable of providing a signal having a magnitude indicative of signals received by said quadrant including a $B_1$ signal, a $B_2$ signal, a $B_3$ signal and $B_4$ signal, respectively; and a receiver, responsive to each of the signals $B_1$, $B_2$, $B_3$ and $B_4$, to provide a sum signal $\Sigma$ having a magnitude which is equal to a sum of the magnitudes of the $B_1$ signal, the $B_2$ signal, the $B_3$ signal and the B4 signal and an off axis indication signal I which is equal to $\{|B_1-B2|+|B_2-B_3|+|B_3-B_4|+|B_4-B_1|\}/|\Sigma|$.

3. The radar system as recited in claim 2 comprising:

a comparator, responsive to the off axis indication signal I, to compare the off axis signal I with a pre-determined threshold value and providing a positive off axis indication signal when the off axis indication signal I exceeds the pre-determined threshold value.

4. The radar system as recited in claim 2 wherein the receiver comprises a plurality of analog-to-digital converters and each of the respective signals $B_1$, $B_2$, $B_3$ and $B_4$ are first converted from an analog signal to a digital signal before the receiver provides the sum signal and the off axis indication signal.

5. The radar system as recited in claim 2 wherein the receiver comprises a monopulse arithmetic circuitry to provide monopulse signals including a sum signal $\Sigma$, a $\Delta_{az}$ signal, a $\Delta_{el}$ signal and a Q signal, where $\Sigma=B_1+B_2+B_3+B_4$; $\Delta_{az}=B1-B2-B_3+B_4$; $\Delta_{el}=B_1+B_2-B_3-B_4$; and $Q=B_1-B_2+B_3-B_4$.

6. A radar system comprising:

an antenna with monopulse arithmetic circuitry capable of providing a $\Sigma$ signal, a $\Delta_{az}$ signal, a $\Delta_{el}$ signal and a Q signal, each of the respective signals having a magnitude; and a receiver, responsive to the $\Sigma$ signal, the $\Delta_{az}$ signal, the $\Delta_{el}$ signal and the Q signal, to provide an off-axis indication signal, I, where the off-axis indication signal I is equal to a sum of the magnitudes of the $\Delta_{az}$ signal, the $\Delta_{el}$ signal and the Q signal divided by the magnitude of the $\Sigma$ signal.

7. The radar system as recited in claim 6 comprising:

a comparator, responsive to the off axis indication signal I, to compare the off axis signal I with a pre-determined threshold value and providing a positive off axis indication signal when the off axis indication signal I exceeds the pre-determined threshold value.

8. The radar system as recited in claim 7 wherein the receiver comprises a CFAR detection circuit to filter out undesired signals including signals from antenna sidelobes; and a nulling circuit to reject off-axis signals which are of sufficient strength to pass the CFAR detection circuit when there is a positive off axis indication signal.

9. A method of operating a monopulse radar system comprising the steps of:

forming a sum signal, $\Sigma$, an azimuth difference signal, $\Delta_{az}$, an elevation difference signal, $\Delta_{el}$, and a Q difference signal, Q, and obtaining magnitudes of each of the respective signals;

comparing the magnitude of the azimuth difference signal, $\Delta_{az}$ with the magnitude of the sum signal, $\Sigma$;

comparing the magnitude of the elevation difference signal, $\Delta_{el}$ with the magnitude of the sum signal, $\Sigma$;

comparing the magnitude of the Q difference signal, Q with the magnitude of the sum signal, $\Sigma$;

summing each result of the comparing steps; and comparing the summed result with a threshold value to determine an off-axis indication.

10. A method of operating a monopulse radar system comprising the steps of:

forming difference signals of the four possible combinations of contiguous beam pairs;

comparing magnitudes of the differences to a sum pattern magnitude; and summing each result of the comparing step.

11. The method as recited in claim 10 comprising the step of comparing the result of the summary step with a threshold value.

12. The method as recited in claim 10 wherein the forming difference signals step comprises the steps of:

forming a respective digital signal indicative of a signal from each quadrant of a monopulse antenna; and forming difference signals of each possible combination of signals from each quadrant of the monopulse antenna and deriving a magnitude of each of the respective difference signals.

13. The method as recited in claim 12 wherein the comparing magnitudes of the differences to a sum pattern magnitude comprises the steps of:

forming a sum signal indicative of a combined signal from all quadrants of a monopulse antenna and deriving a magnitude of said sum signal; and comparing the magnitude of each of the difference signals to the magnitude of the sum signal.

14. The method as recited in claim 13 further comprising the steps of:

comparing the result of the summing step with a threshold value.

15. A method of operating a monopulse radar system comprising the steps of:

forming a respective digital signal indicative of a signal from each quadrant of a monopulse antenna;

forming a sum signal indicative of a combined signal from all quadrants of the monopulse antenna and deriving a magnitude of said sum signal;

forming difference signals of each possible combination of signals from each quadrant of the monopulse antenna and deriving a magnitude of each of the respective difference signals;

comparing the magnitude of each of the difference signals to a magnitude of the sum signal; and summing each result of the comparing step.

\* \* \* \* \*